(12) United States Patent
Taguchi

(10) Patent No.: US 6,590,977 B1
(45) Date of Patent: Jul. 8, 2003

(54) ANALOG SUBSCRIBER CIRCUIT

(75) Inventor: Kiyoshi Taguchi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/338,141

(22) Filed: Jun. 22, 1999

(30) Foreign Application Priority Data

Dec. 18, 1998 (JP) .......................................... 10-360405

(51) Int. Cl.[7] .......................... H04M 1/00; H04M 9/00; H04M 9/08
(52) U.S. Cl. .............. 379/413.01; 379/413; 379/399.01
(58) Field of Search ....................... 379/399.01, 399.02, 379/401, 412, 413, 413.01, 413.02, 372, 373.01, 377, 380

(56) References Cited

U.S. PATENT DOCUMENTS 5,163,090 A * 11/1992 Pawlowski et al.
5,566,239 A * 10/1996 Garcia et al.
5,926,544 A * 7/1999 Zhou

* cited by examiner

*Primary Examiner*—Duc Nguyen
(74) *Attorney, Agent, or Firm*—Katten Muchin Zavis Rosenman

(57) ABSTRACT

A subscriber circuit is capable of realizing a CLIP service in an old-fashioned switching system. The subscriber circuit has a ringer transmitting circuit, which is connected to line A and line B, and which transmits a ringer signal in accordance with a ringer transmission request signal from a host system; a battery feed circuit, which supplies speech current to line A and line B; and a timer, which detects, in accordance with a change in the level of a ringer transmission request signal from the above-mentioned host system, the end of transmission of a ringer signal transmitted by the ringer transmitting circuit, starts timer operation, and ends this timer operation after a predetermined time has elapsed. The battery feed circuit supplies speech current to line A and line B from the above-mentioned battery feed circuit during the operation period of the timer.

6 Claims, 22 Drawing Sheets

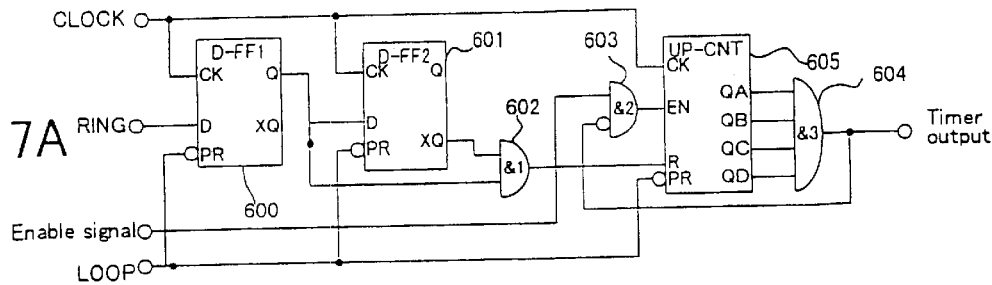
FIG. 7A
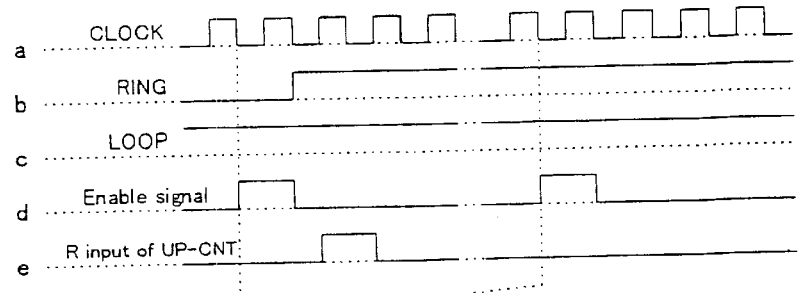
FIG. 7B
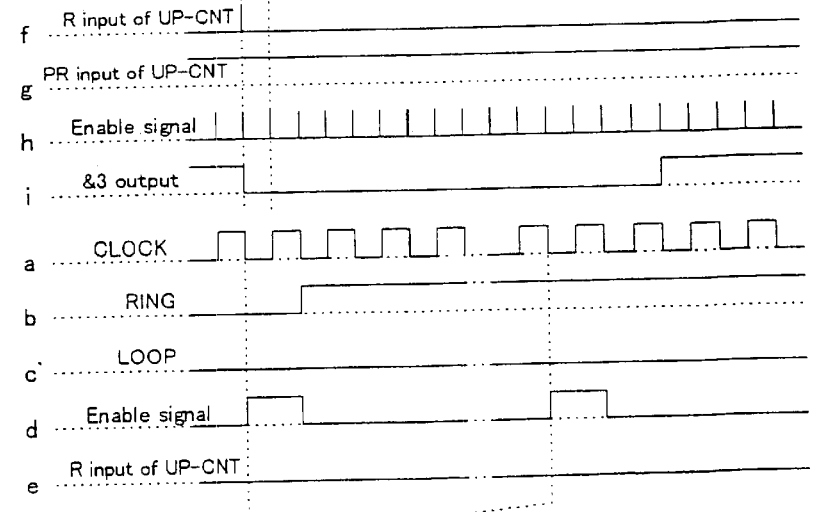
FIG. 7C
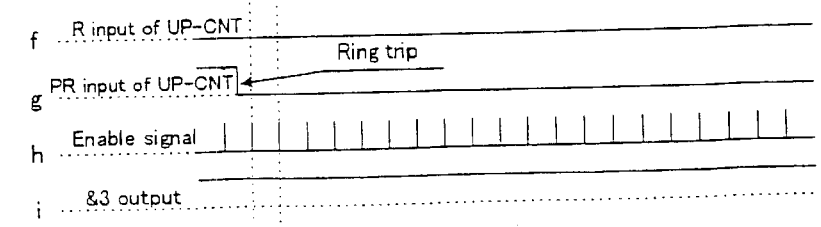

ANALOG SUBSCRIBER CIRCUIT

BACKGROUND OF THE INVENTION

1. Field of the Invention

The present invention relates to an analog subscriber circuit, comprising an electronic switching system on-hook transmission function.

2. Description of the Related Art

As a service targeted at an analog user in an electronic switching system, there is demand for a Calling Line Identification Presentation (CLIP) service in accordance with an on-hook transmission function.

A CLIP service is a function, which sends to an on-hook transmission-capable subscriber terminal from an electronic switching system the number of a calling party and other information data, which is displayed on the subscriber terminal in the subscriber circuit non-feed state of the silent state between rings during ringing processing.

This kind of CLIP service has been provided for digital circuits for some time. In recent years, the same service has begun to be offered for analog circuits as well.

In particular, telephone service rate systems differ according to region (country). In some regions, only the calling party pays the charges, and in other regions, both the calling party and the called party pay charges. The need for the CLIP service is especially high in regions, which use the latter rate system.

This is because it is possible, in accordance with a CLIP service, to confirm incoming calls from high toll charge portable telephones, and incoming calls felt to be unnecessary. In accordance therewith, it is possible to reduce telecommunications expenses by selecting and receiving only necessary incoming calls.

Therefore, the CLIP service has become common in recent years, and is provided as a standard function of recent switching systems. However, to realize this CLIP function, the following functions are required in addition to the ordinary functions of an analog subscriber.

First, an on-hook transmission (OHT) function is required.

An OHT function is a function, which realizes a one-way call from a subscriber circuit to a terminal in the non-feed state in which there is no speech current when the subscriber terminal is in the on-hook state (the telephone handset is resting in its cradle).

When a subscriber terminal, which is connected to the battery feed circuit composed of non-mechanical electronic components in an analog subscriber circuit, is in the on-hook state, the output of the line B battery feed circuit extends to the ground potential, and the output of the line A battery feed circuit extends to VBB. Therefore, since clamping occurs if a voice signal attempts to pass through in this state, this function applies a bias to both the line B battery feed circuit and the line A battery feed circuit to prevent such clamping.

Second, a function is required for increasing power when CLIP is requested. An ordinary analog subscriber circuit monitors whether the subscriber terminal is in the on-hook state, or in the off-hook state (state in which the handset is removed from the cradle). When the subscriber terminal is in the on-hook state, power to a coder-decoder circuit (CODEC) is decreased for the purpose of cutting down on current consumption.

However, in order to utilize the CODEC to send a voice signal when there is a CLIP state request from the system, the power to the CODEC must be increased even if the subscriber terminal is in the on-hook state.

Therefore, a CLIP request interface is provided between an analog subscriber circuit and the system, and when a CLIP request is sent from the system, the analog subscriber circuit switches the battery feed circuit to the OHT mode, and increases power to the CODEC. However, there are numerous problems involved in providing a CLIP service in an old-fashioned switching system (a switching system designed before the CLIP service was available). When, in accordance with a customer request, an analog subscriber circuit is upgraded or replaced for the purpose of providing a CLIP service in an old-fashioned switching system, the problems set forth hereinbelow occur.

When attempting to upgrade to a CLIP function-equipped subscriber circuit designed for a switching system premised on the provision of a CLIP service, it is necessary to provide a new CLIP function control hardware-based interface with the host system of the subscriber circuit. As a result, the existing system must undergo major modifications.

Moreover, even if a hardware interface is provided with the host system, because the host system does not take CLIP service processing into consideration, the analog subscriber circuit does not process CLIP control fast enough.

Therefore, to enable the provision of a CLIP service even without host system control, based on a CLIP function-equipped subscriber circuit designed for a switching system premised on the provision of a CLIP service, steps were taken to design a subscriber circuit, which is constantly in the OHT mode (battery feed circuit is normally in the OHT mode, and the CODEC is constantly being powered up). However, this gave rise to the following problems.

Because the CODEC is constantly being powered up, the current consumption of the subscriber circuit increases. And because the battery feed circuit is normally in the OHT mode, the open loop voltage between the A and B lines of the subscriber circuit decreases when the subscriber terminal is on-hook, causing the subscriber terminal, which monitors the voltage of the subscriber line, to malfunction.

Since the battery feed circuit is normally in the OHT mode, sufficient current cannot be supplied to a long-distance distance subscriber terminal due to the decrease of speech current when the subscriber terminal is off-hook. Accordingly, long-distance subscribers capable of being accommodated up until now can no longer be accommodated.

SUMMARY OF THE INVENTION

An object of the present invention is to solve the above-mentioned problems by providing a subscriber circuit capable of realizing a CLIP service in a conventional switching system.

More particularly, an object of the present invention is to provide a new CLIP function-equipped analog subscriber circuit, comprising a control circuit which autonomously detects ringing, and the silent state between ringing, and sets the battery feed circuit to the OHT mode, and increases power to the CODEC during the silent state thereof in order to solve for the above-mentioned problems.

An analog subscriber circuit for achieving the above-mentioned tasks in accordance with the present invention is an analog subscriber circuit for use in a switching system, which supplies a ringer signal to a subscriber line via a ringer relay, and the analog subscriber circuit includes a timer, which commences timer operation when the recovery of the ringer relay is detected, and terminates the timer operation at a predetermined time, a battery feed circuit supplying speech current to the subscriber line via the ringer relay when a subscriber terminal is in an off-hook state, and a circuit, which controls the bias voltage of said battery feed circuit to the ON state during the operation period of the timer.

As one mode, the above-mentioned analog subscriber circuit is characterized in that it has a loop detecting circuit, which also detects when a telephone terminal is off-hook, and the above-mentioned timer is reset by the loop detecting circuit in accordance with detecting that the above-mentioned telephone terminal is off-hook.

As yet another mode, the above-mentioned analog subscriber circuit is characterized in that the above-mentioned timer can be set to an arbitrary timer time.

As one specific constitution, the above-mentioned analog subscriber circuit has a ringer transmitting circuit, which is connected to line A line and line B, and which transmits a ringer signal in accordance with a ringer transmission request signal from the host system, a battery feed circuit, which supplies speech current to the line A and line B, and a timer, which, in accordance with a change in the level of a ringer transmission request signal from the above-mentioned host system, detects the end of transmission of a ringer signal sent by the ringer transmitting circuit, starts timer operation, and, after the passage of a predetermined period of time, terminates this timer operation, and the analog subscriber circuit is characterized in that it is constituted so that a speech current is supplied to this line A and line B from the above-mentioned battery feed circuit during the above-mentioned timer operation period.

Further, the above-mentioned specific constitution is characterized in that it also has a CODEC, which converts subscriber information data from the above-mentioned host system to an analog signal, and power to this CODEC is increased during the above-mentioned timer operation pFXfF period.

The characteristics of the present invention are further clarified from the aspects of the embodiment of the invention, which are explained hereinbelow in accordance with the figures.

BRIEF DESCRIPTION OF THE DRAWINGS

FIGS. 7A, 7B and 7C are diagrams showing an example of the timer circuit 60 in the embodiment of FIG. 5, and the operational time chart thereof;

DESCRIPTION OF THE PREFERRED EMBODIMENTS

Figure 1:
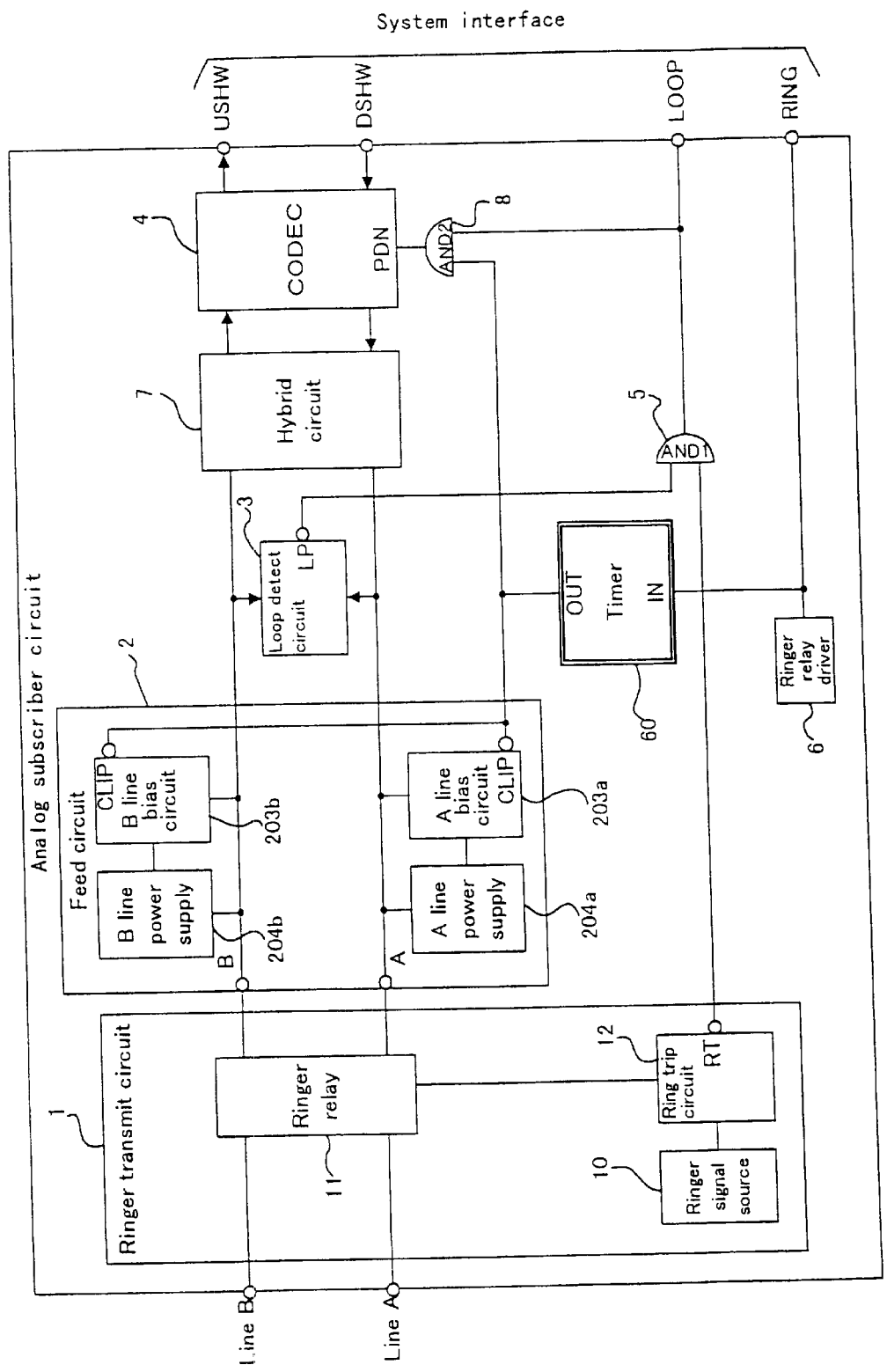
FIG. 1 is a block diagram of the basic constitution of the presenvention.

The embodiment of the present invention are described hereinbelow with reference to the figures. Furthermore, in the figures, the same or similar elements are described using the same reference numerals or reference symbols.

Here, for an accurate understanding of the present invention, an example of the constitution of a conventional subscriber circuit, and problems related thereto, are reviewed prior to describing the embodiments of the present invention.

Figure 10:
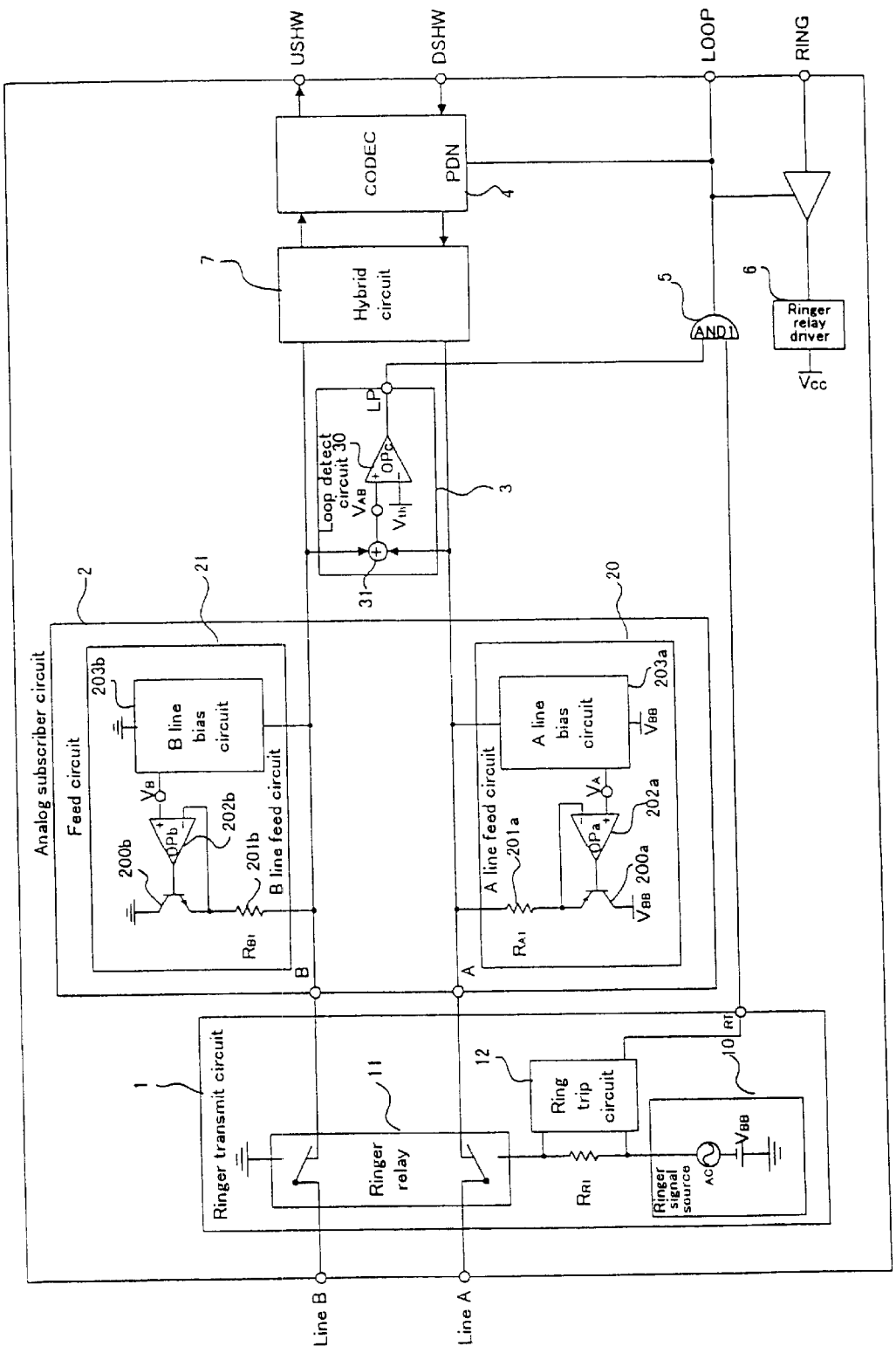
FIG. 10 is a diagram showing the constitution of an ordinary analog subscriber circuit, which does not possess CLIP functions.

FIG. 10 is the constitution of an ordinary analog subscriber circuit, which does not possess CLIP functions. An analog subscriber circuit not equipped with CLIP functions is constituted by comprising a ringer transmitting circuit 1, battery feed circuit 2, loop detecting circuit 3, CODEC 4, AND circuit (AND1) 5, ringer relay driver 6, and hybrid circuit 7.

Each of the above-mentioned components of an analog subscriber circuit are described hereinbelow.

In the battery feed circuit 2 there are battery feed circuits 20, 21 corresponding to subscriber lines A and B, respectively. Each battery feed circuit 20, 21 is constituted having a feed transistor 200a, 200b, a feed resistor 201a, 201b, an operational amplifier (op amp) 202a, 202b, and a bias circuit 203a, 203b, as well as a hybrid circuit 7.

The bias circuit 203a, 203b monitors the subscriber line, controls voltage developed across transmission resistance, and supplies power at a constant resistance. The equivalent resistance of the battery feed circuit 2 is set at around 250Ω for both the line A side and the line B side.

Figure 11:
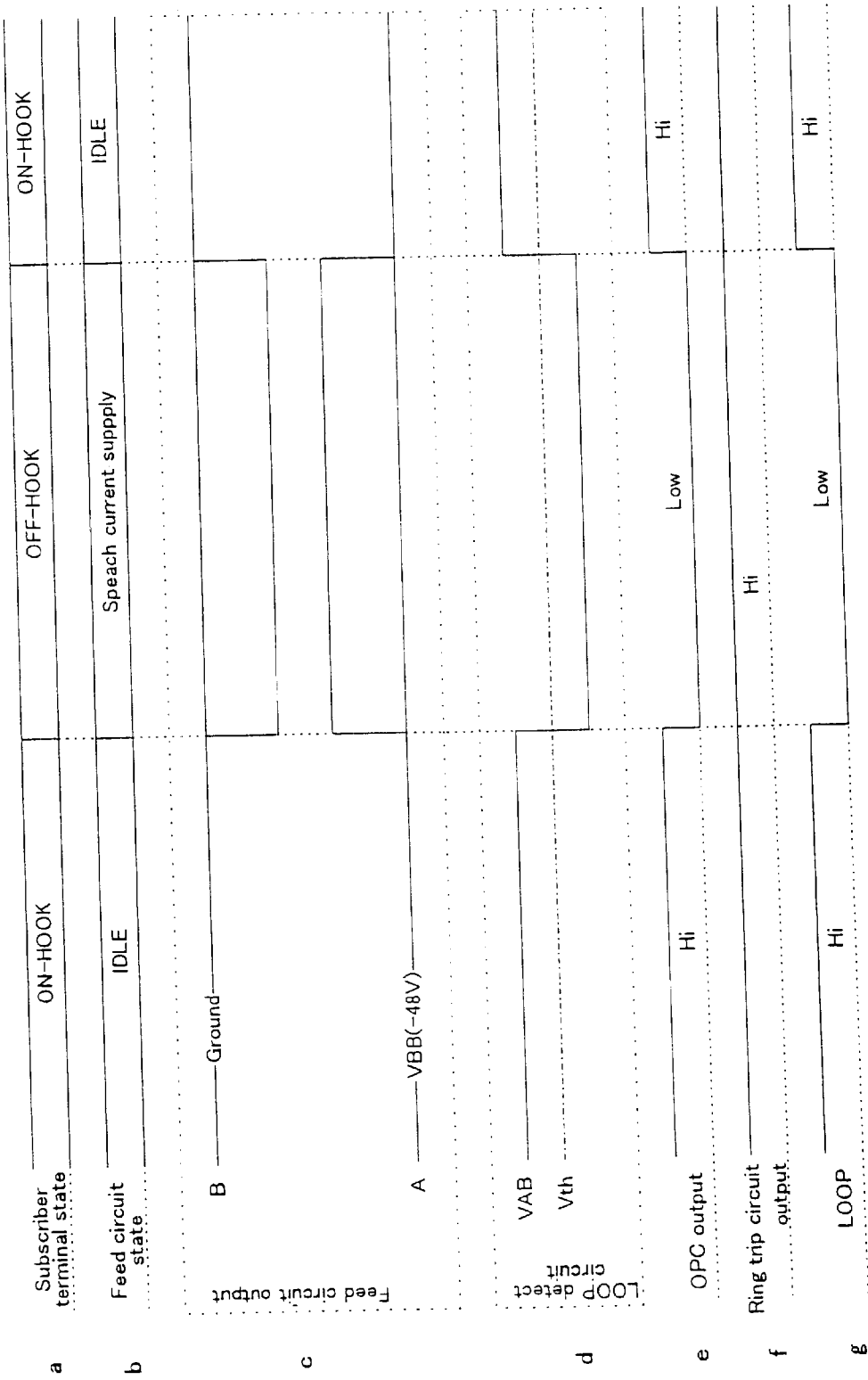
FIG. 11 is a diagram showing the outputted waveforms of a battery feed circuit 2 when a subscriber terminal is on-hook/off-hook.

FIG. 11 shows the outputted waveform of the battery feed circuit 2 when the subscriber terminal is on-hook/off-hook. Because there is no speech current when the subscriber terminal is on-hook, and because the battery feed circuit 2 equivalent is 250Ω, the potential of line B can be seen as ground potential (Ground), and the potential of line A can be seen as the power supply of VBB, respectively.

Because speech current is flowing when the subscriber terminal is off-hook, the potentials of line A and line B approach a point between ground potential and VBB.

For example, if subscriber terminal and line impedance are assumed to be 1900Ω, and the speech current is 20 mA [48V÷(1900Ω+250Ω×2)], the potential of the line A side battery feed circuit becomes −43V [−48V−250Ω×20 mA], and the potential of the line B side battery feed circuit becomes −5V [0V−250Ω×20 mA].

The loop detecting circuit 3 normally (at times other than ringer transmission) monitors the voltage of the subscriber line. The voltage between subscriber lines (VAB) is compared with a preset threshold voltage (Vth) in a comparator (OPc) 30. In accordance therewith, it detects subscriber terminal on-hook/off-hook.

When the output LP of the comparator (OPc) 30 is LP="Low", the off-hook state is detected, and when this output is LP="High" the on-hook state is detected. That is, as shown in FIG. 11c, the sum (VAB) of the difference between the ground potential and line B potential, and the difference between VBB and the line A potential is determined by an adder circuit 31. The value of this sum (VAB) is compared against the preset threshold voltage (Vth), and the loop detecting circuit 3 detects whether the subscriber terminal is on-hook or off-hook (FIG. 11d).

The ringer detecting circuit 1, in accordance with a request from the host system (system) of the subscriber circuit, transmits from a ringer relay 11 via a transmission resistance (RR1) a 90 Vrms ringer signal superimposed to VBB, this ringer signal being generated in accordance with a ringer signal source (usually in common with the system) 10.

The ringer transmitting circuit 1 has a ring trip circuit 12, which monitors both ends of transmission resistance (RR1) during ringer transmission, and monitors [to determine] whether the subscriber terminal is off-hook. When potential at both ends RT of transmission resistance (RR1) is RT="Low" the subscriber terminal is off-hook, and when RT="High" the subscriber terminal is on-hook.

Figure 12:
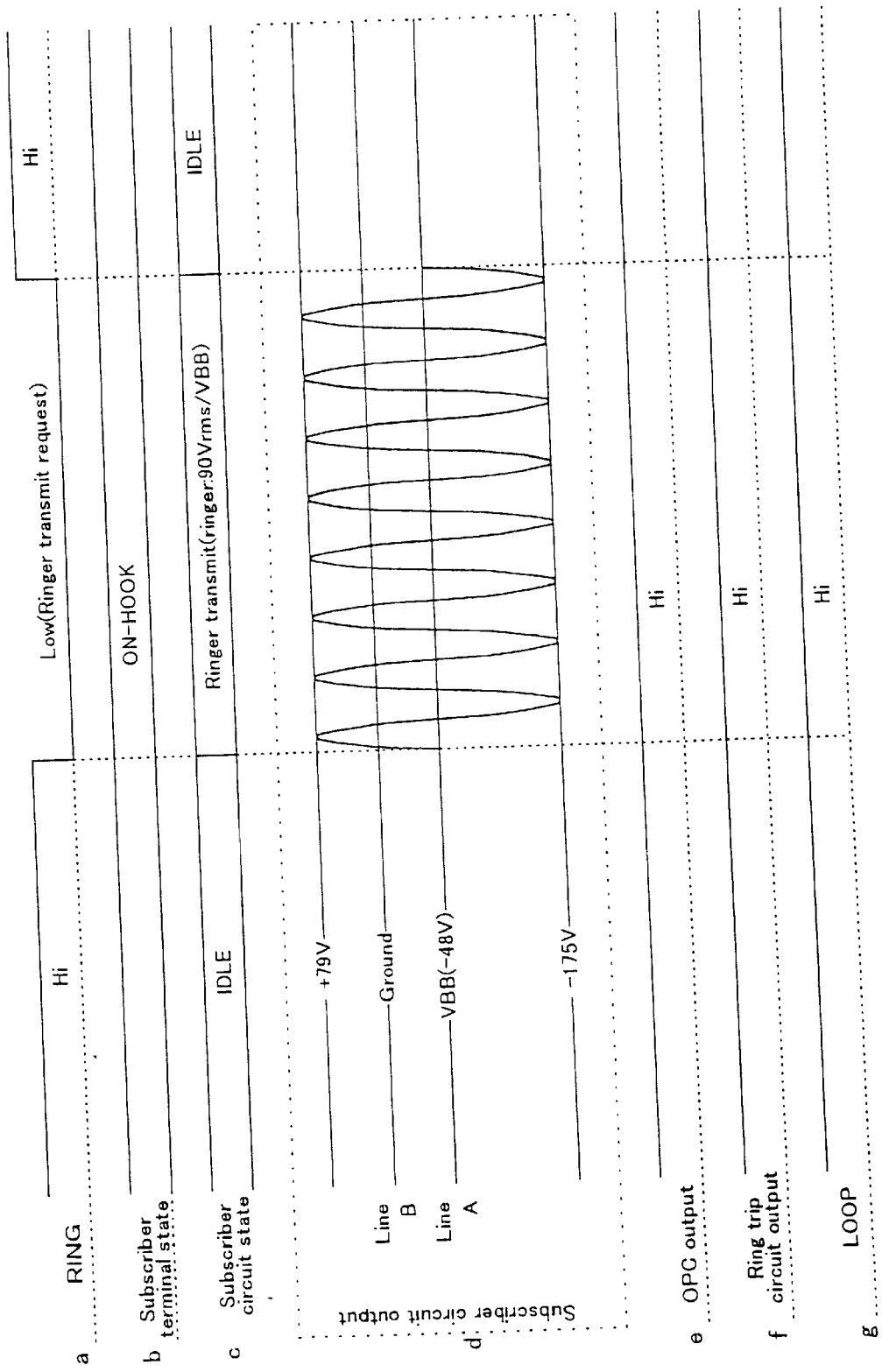
FIG. 12 is a diagram showing ringer transmission timing.
Figure 13:
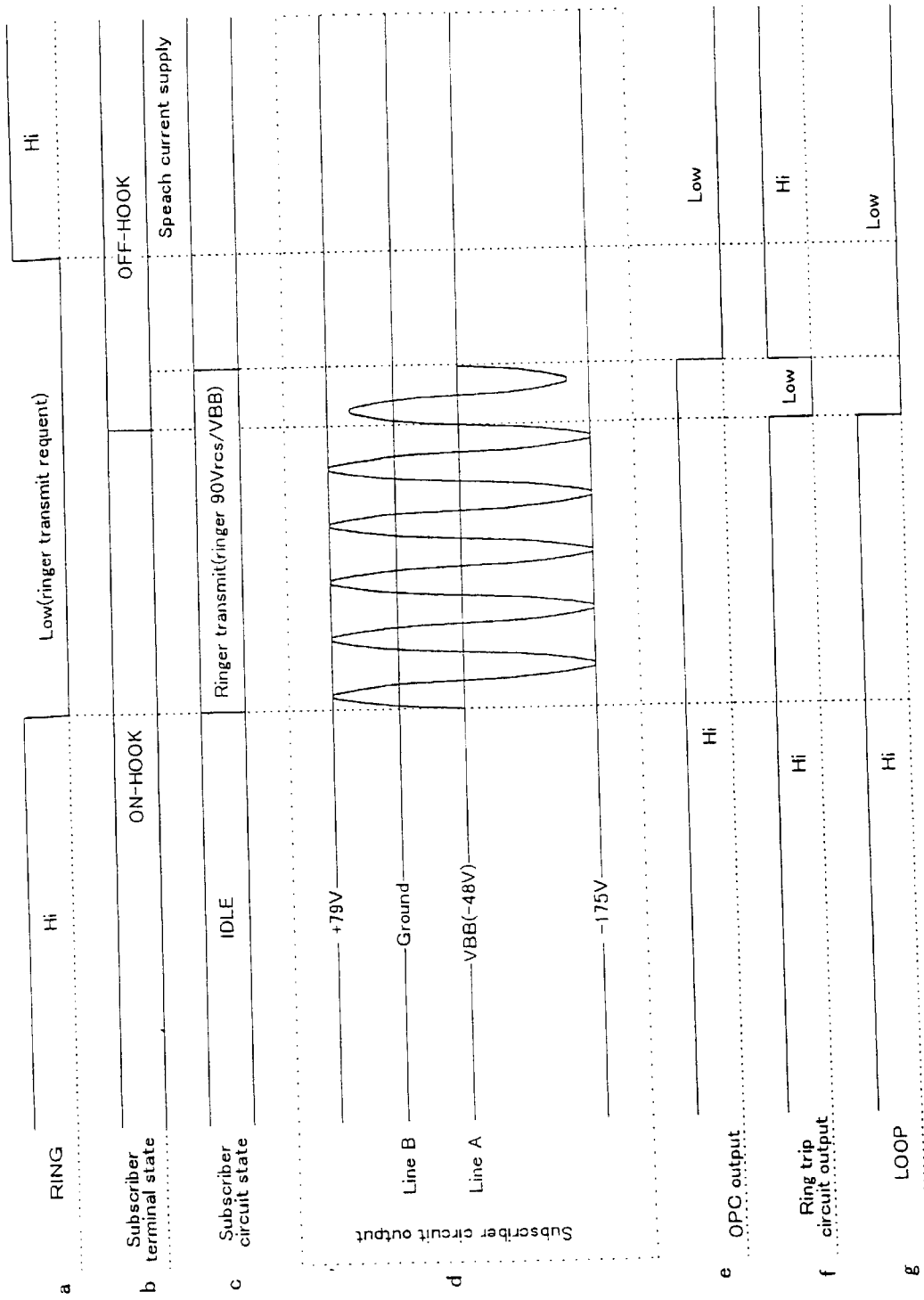
FIG. 13 is a diagram showing the operational timing of a ring trip circuit 12.

FIG. 12 shows ringer transmission timing, and FIG. 13 shows the operational timing of the ring trip circuit 12.

In FIG. 12g, at LOOP="High" state, as shown in FIG. 12a, RING="Low" at ringer transmission request, and a ringer signal is supplied to the subscriber terminal (FIG. 12d).

In FIG. 13, when the subscriber terminal is off-hook (FIG. 13b) during ringer transmission (FIG. 13d), the ring trip circuit 12 detects this state (ring trip circuit output is RT="Low"), the ringer relay 11 recovers after a short period (FIG. 13f), and speech current can be supplied (FIG. 13b).

The ringer relay driver 6 drives the ringer relay 11 contact in accordance with a request (RING) from the system. At LOOP="High" state, the ringer relay is driven at RING="Low" and a ringer signal from the signal source 10 is supplied to the subscriber terminal from the subscriber circuit (FIG. 12, FIG. 13a).

The AND gate 5 (AND1) derives the logical product (AND) of subscriber terminal on-hook/off-hook detection results during ringer transmission (RT), and subscriber terminal on-hook/off-hook detection results in a state other than ringer transmission (LP), treats this as a comprehensive subscriber terminal on-hook/off-hook detection result (LOOP), and notifies the system. LOOP="Low" is off-hook, and LOOP="High" is on-hook (FIG. 13g).

The hybrid circuit 7 performs mutual conversion of the subscriber lines A and B, and the 4 lines on the CODEC 4 side (2 line/4 line conversion).

CODEC 4 is a coding/decoding circuit, which converts analog signals and digital signals.

Figure 14:
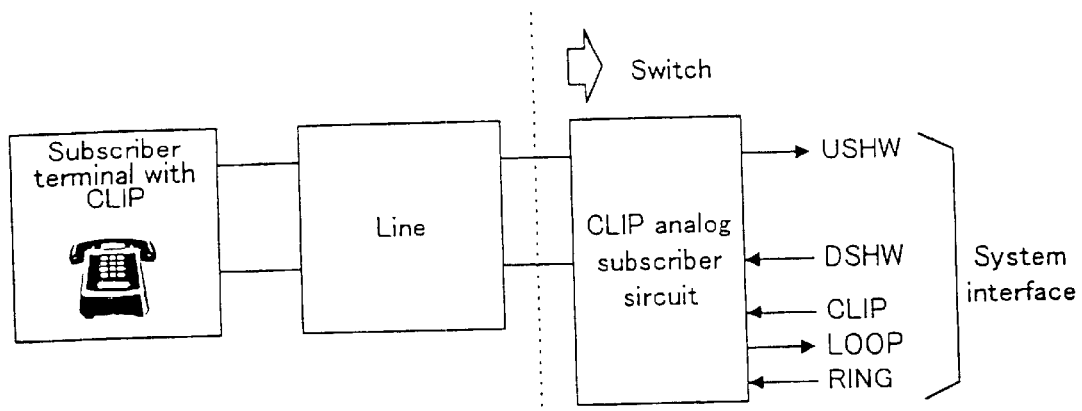
FIG. 14 is a diagram illustrating a first environment of an analog subscriber circuit having CLIP functions.
Figure 15:
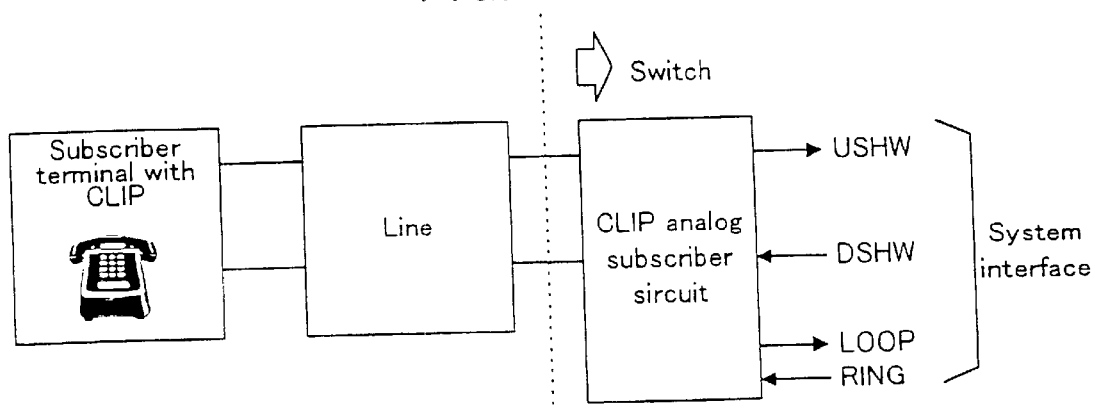
FIG. 15 is a diagram illustrating a second environment of an analog subscriber circuit having CLIP functions.

FIGS. 14 and 15 provide illustrations of the environment in an analog subscriber circuit having CLIP functions. The analog subscriber circuit environment for CLIP shown in FIG. 14 takes a customer request for CLIP services into consideration, and at system design, provides an interface corresponding to CLIP services (CLIP) between the subscriber line and the system. A first example of a conventional analog subscriber circuit shown in FIG. 16, which is described below, operates under this environment.

The environment of the CLIP analog subscriber circuit of FIG. 15 was designed at a time when CLIP services did not exist, and as such, there are cases wherein there is no CLIP request interface between the subscriber line and the host system.

The CLIP function-equipped analog subscriber circuit (second example of prior art) of FIG. 19, and the CLIP function-equipped analog subscriber circuit (third example of prior art) of FIG. 21 described below operate under this environment.

Figure 16:
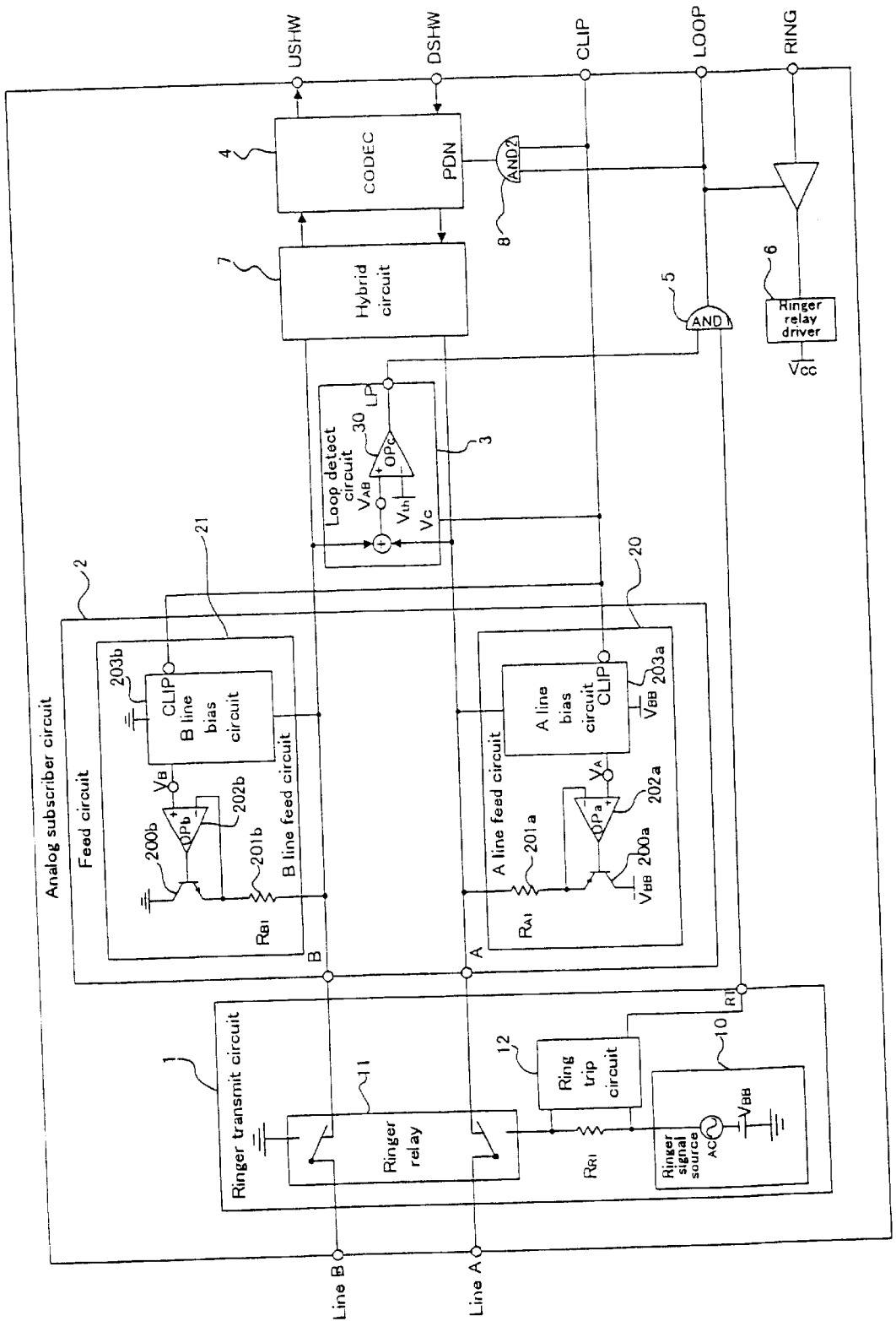
FIG. 16 is a block diagram of a CLIP function-equipped analog subscriber circuit as a first example of prior art.

FIG. 16 is a block diagram of a CLIP function-equipped analog subscriber circuit provided as a first example of prior art. The difference between this circuit and the ordinary analog subscriber circuit without CLIP functions of FIG. 10 above is that CLIP control is provided in the system interface, and the following functions are added in accordance therewith.

Figure 17:
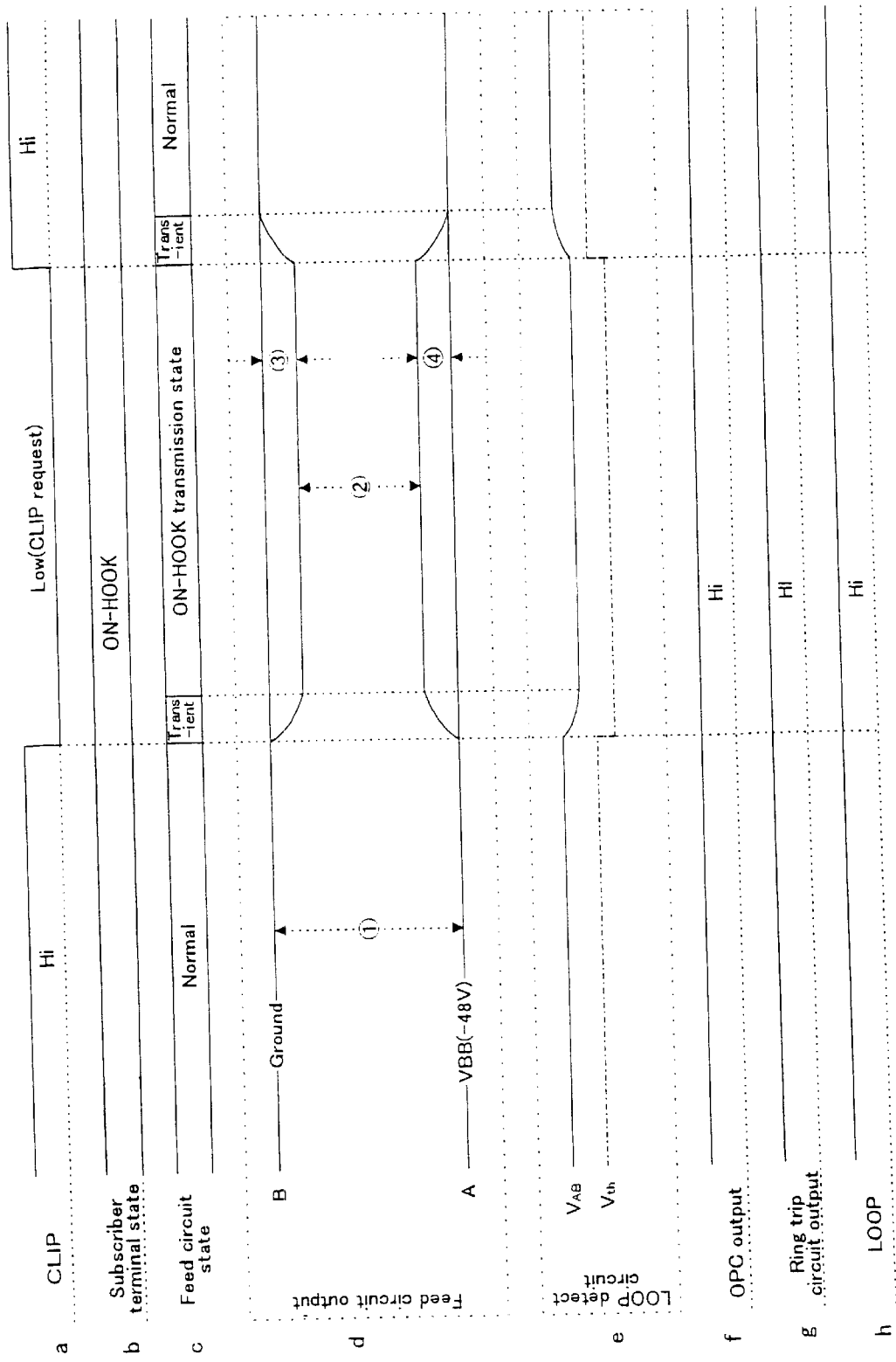
FIG. 17 is a diagram showing the timing of an OHT function of the analog subscriber circuit of FIG. 16.

That is, at CLIP="Low" the battery feed circuit 2 is set to the OHT mode, and power is increased to the CODEC 4. FIG. 17 shows the timing of the OHT function of the analog subscriber circuit of FIG. 16.

In FIG. 17a, at CLIP="High" the outputted waveform of the battery feed circuit when the subscriber terminal is on-hook is the same as that shown in FIG. 11 above. At CLIP="Low" the bias of the battery feed circuit 20 on the line A side steadily transitions approximately +4V from the VBB level (FIG. 17d 4̂), and the bias of the battery feed circuit 21 on the line B side steadily transitions approximately −4V from the ground level (FIG. 17d 3̂) (in the battery feed circuit state marked "transient" in FIG. 17c).

In FIG. 17, mark 1̂ indicates an open loop voltage when the battery feed circuit 20 is under the normal bias state, mark 2̂ indicates open voltage when the battery feed circuit is under the bias state of CLIP request, mark 3̂ indicates B-line bias when the battery feed circuit is under the bias state of CLIP request, and mark 4̂ indicates A-line bias when the battery feed circuit is under the bias state of CLIP request.

Here, the bias voltage is set at 4V so that a voice signal is not clamped by the battery feed circuit composed of non-mechanical electronics components. Therefore, the open loop voltage when the subscriber terminal is on-hook is 48V in the battery feed circuit normal state (Normal), and becomes 40V (VBB−4V×2) in the OHT mode.

At CLIP="Low" (when there is a CLIP request), power is increased to the CODEC 4. Consequently, as described below, a second AND gate (AND2) 8 is provided. At CLIP="Low" the threshold voltage (Vth) inside the loop detecting circuit 3 is set for the OHT mode. Because VAB potential decreases at CLIP="Low" to prevent detection errors, Vth is changed when the battery feed circuit 2 is in the OHT mode.

Figure 18:
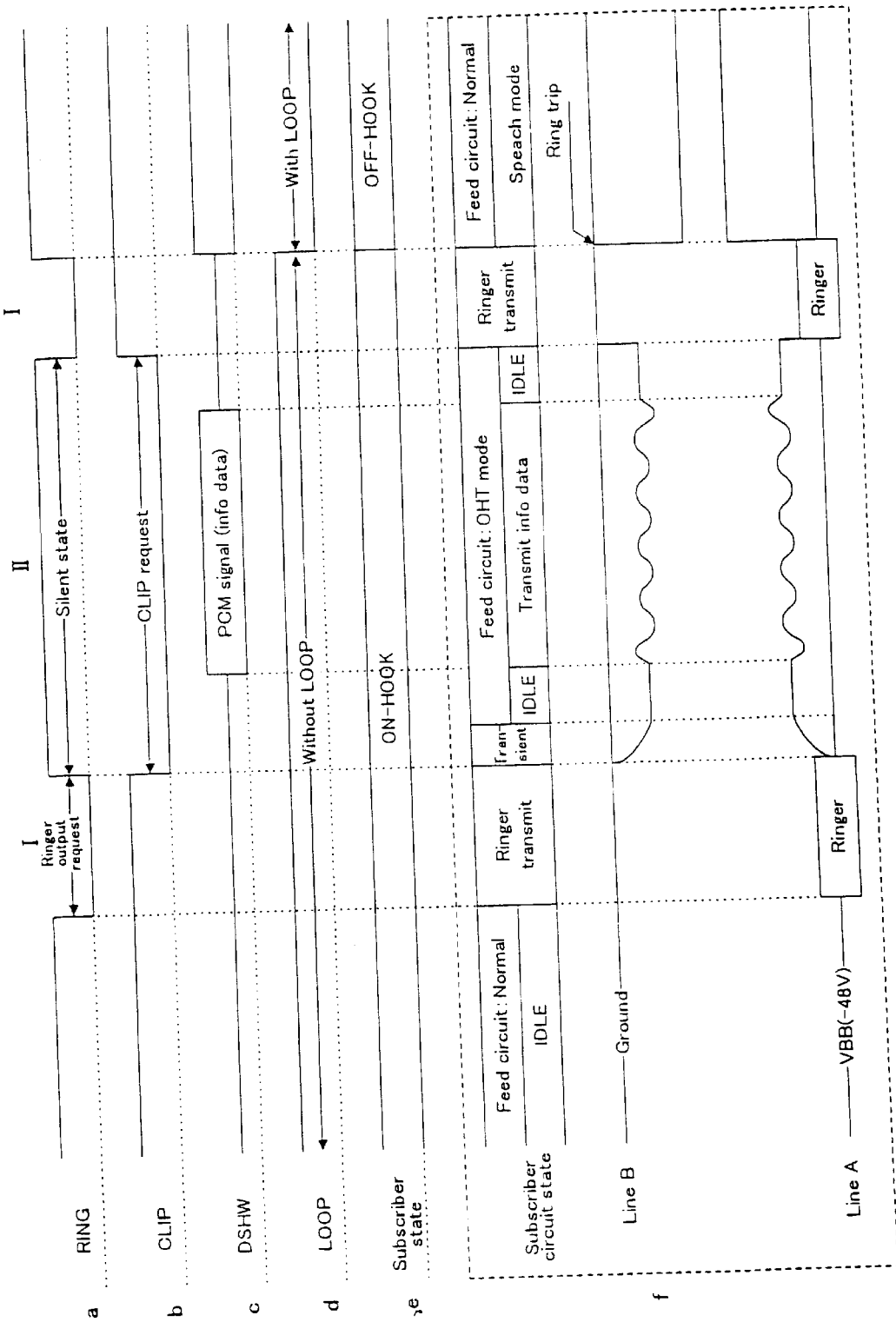
FIG. 18 is a diagram showing an operational time chart for the CLIP function-equipped analog subscriber circuit shown in FIG. 16 as a first example of prior art.

FIG. 18 shows the operational time chart of the CLIP function-equipped analog subscriber circuit shown in FIG. 16 as a first example of prior art. In an electronic switching system, when there is an incoming call to a terminal, ringing is generated in the subscriber terminal by the subscriber circuit via the subscriber line. Ringing is constituted by repeating a ringer transmission state RING="Low" I, and a silent state II in a certain fixed cycle.

As for on-hook transmission-based CLIP, a CLIP request (CLIP="Low") is made from the electronic switching system (host system of the analog subscriber circuit) in the silent state II of the ringing process, and the analog subscriber circuit sets the battery feed circuit 2 to the OHT mode, and increases power to the CODEC 4. For this reason, a second AND gate (AND2) 8 is provided.

When CLIP="Low" and loop detection is performed, the CODEC 4 is set to a powered up state in accordance with the output of the second AND gate (AND2) 8. In this state, PCM signal information data sent from the system to the subscriber terminal via the downstream highway (DSHW) is inputted (FIG. 18c), this PCM signal is converted to a voice signal (analog signal) by the CODEC 4, and the voice signal information data is transmitted via the hybrid circuit 7 over the subscriber line.

The subscriber terminal is in the on-hook state at this time, and the information data transmitted from the analog subscriber circuit is received by the CLIP-enabled subscriber terminal, and the calling party's telephone number and other information are displayed on a display of this CLIP-enabled subscriber terminal.

In this constitution of FIG. 16, an interface for CLIP control is needed with the host system, and when attempting to realize CLIP functions in a previously developed and shipped system, major hardware modifications are required.

Figure 19:
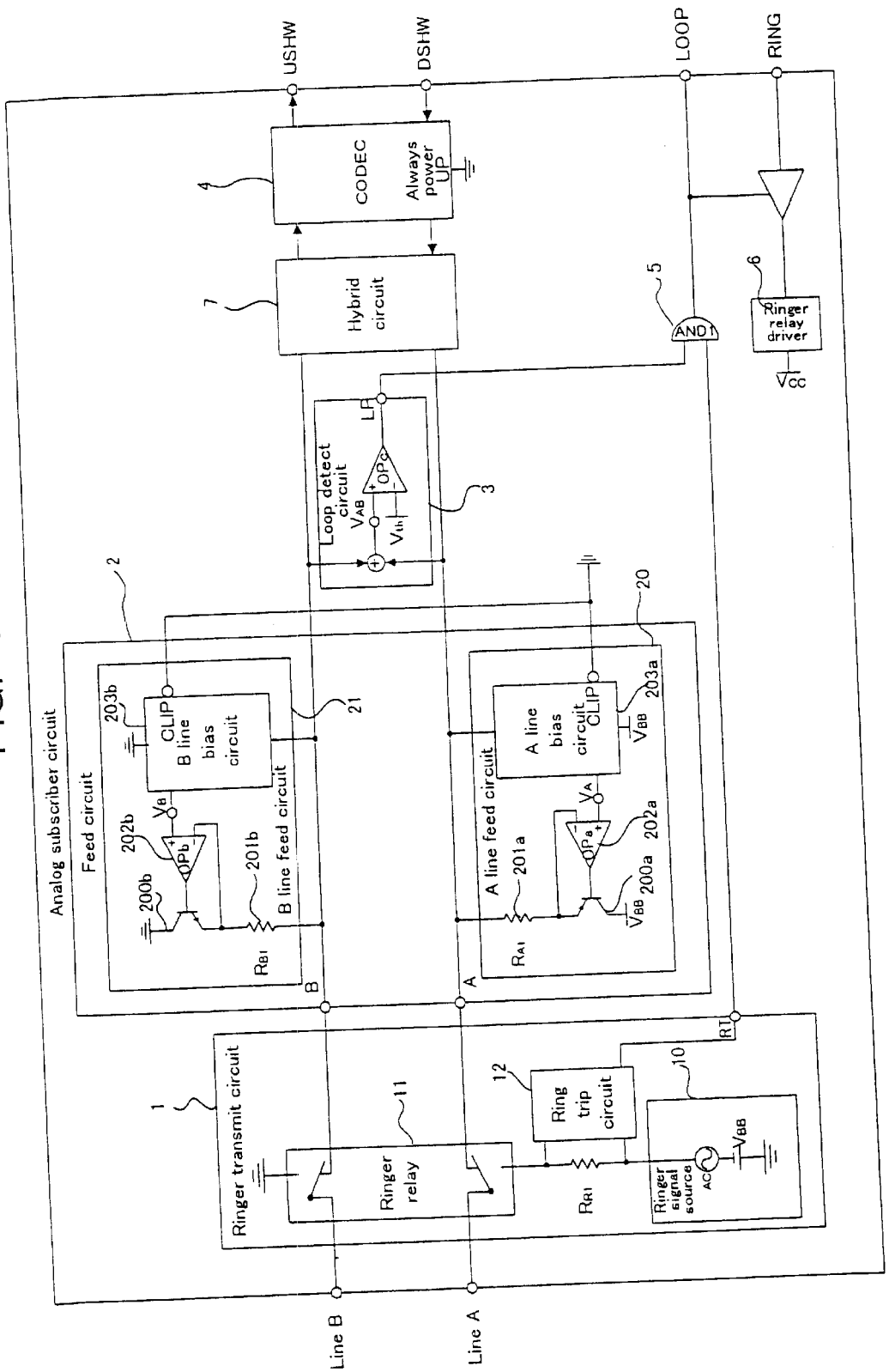
FIG. 19 is a block diagram of an example of the constitution of a CLIP function-equipped analog subscriber circuit as a second example of prior art.

FIG. 19 is a block diagram showing an example of a constitution of a CLIP function-equipped analog subscriber circuit provided as a second example of prior art. The difference between this constitution and that of the CLIP function-equipped analog subscriber circuit of FIG. 16 above is that there is no CLIP system interface, the battery feed circuit is constantly in the OHT mode, and the CODEC is in a powered-up state.

Figure 20:
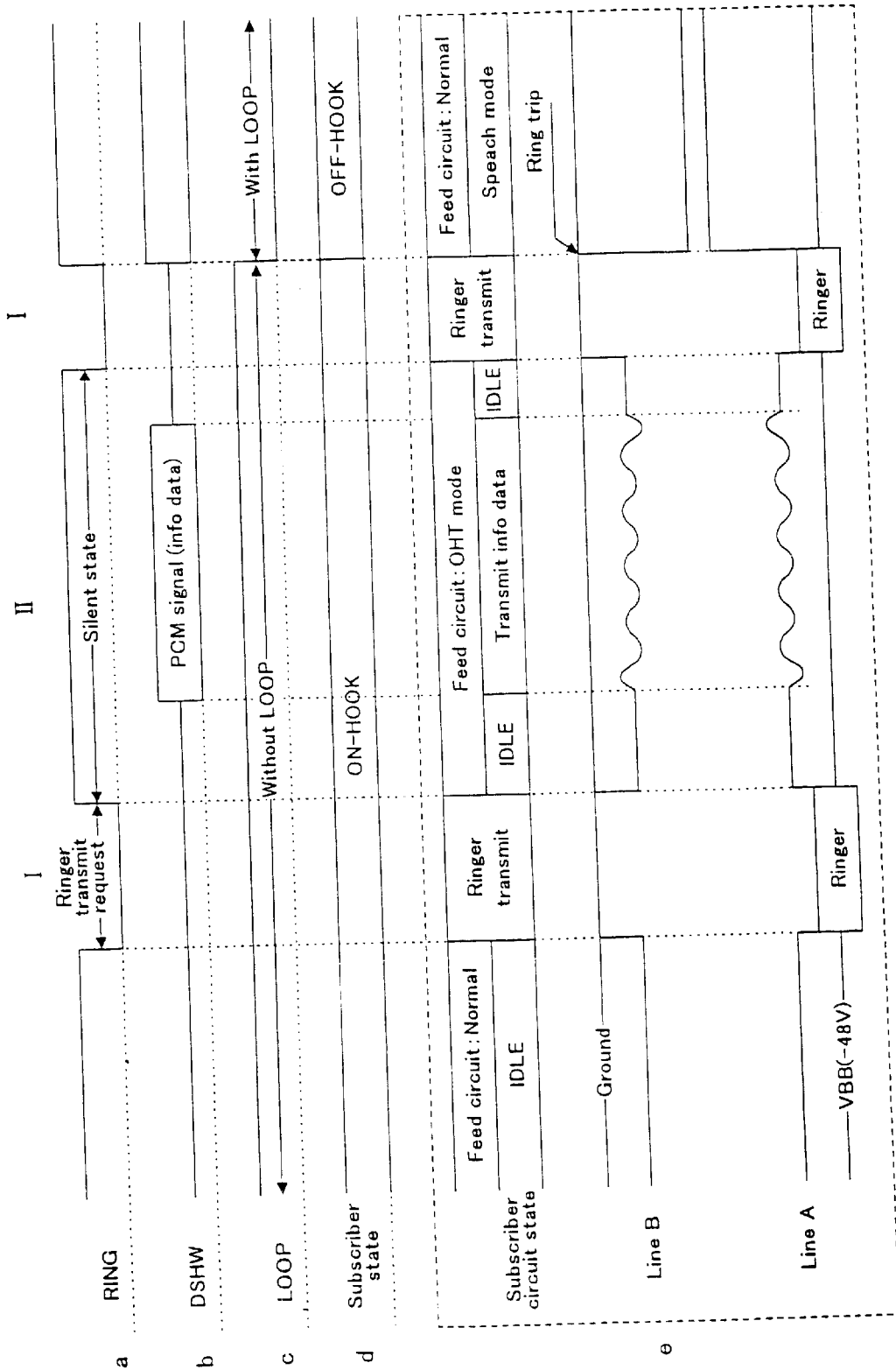
FIG. 20 is an operational timing diagram of the CLIP function-equipped analog subscriber circuit of FIG. 19.

FIG. 20 shows an operational timing diagram of the CLIP function-equipped analog subscriber circuit of FIG. 19. The on-hook transmission operational timing of FIG. 19 illustrates the difference with that of FIG. 18 above. In the CLIP subscriber circuit of FIG. 19, bias is constantly applied to the respective bias circuits 203a, 203b of the battery feed circuit 2 (FIG. 20b).

Therefore, since the battery feed circuit 2 is normally in the OHT mode, information data can be sent at any time other than a ringer transmission state.

With the exception of the above-described difference (difference between FIG. 18f and FIG. 20e), the timing of FIG. 18 and FIG. 20 are the same. Therefore, a PCM signal is sent from the system to the CODEC 4 via the DSHW in the silent state II when there is an incoming call to a CLIP subscriber terminal, this PCM signal is converted to a voice signal (analog signal) by the CODEC 4, and this voice signal is outputted to line A and line B via the hybrid circuit 7 (FIG. 20b).

In this second example of prior art, the following problems occurred as trouble due to the constant application of bias.

When the subscriber terminal is on-hook, the open loop voltage between line A and line B decreases. The terminal on-hook state open loop voltage of the first prior art example was 48V, but with the second prior art example, due to battery feed circuit 2 bias, open loop voltage becomes 40V, decreasing approximately 8V from the past example.

Therefore, when the subscriber terminal is off-hook, trouble arises from the fact that speech current decreases.

Speech current constitutes 20 mA [48V÷(1900Ω+250Ω× 2)] when bias is not applied to the battery feed circuit 2, and the impedance of the subscriber terminal and subscriber line is 1900Ω.

In the OHT mode, there is always 4V of bias on the line A and line B battery feed circuits 203a, 203b, respectively, and speech current when the impedance of the subscriber terminal and subscriber line is 1900Ω works out to 16.67 mA [(48V−4V×2)÷(1900Ω+250Ω×2)].

Further, since the CODEC 4 is constantly powered up, trouble arises from the fact that current consumption increases.

Figure 21:
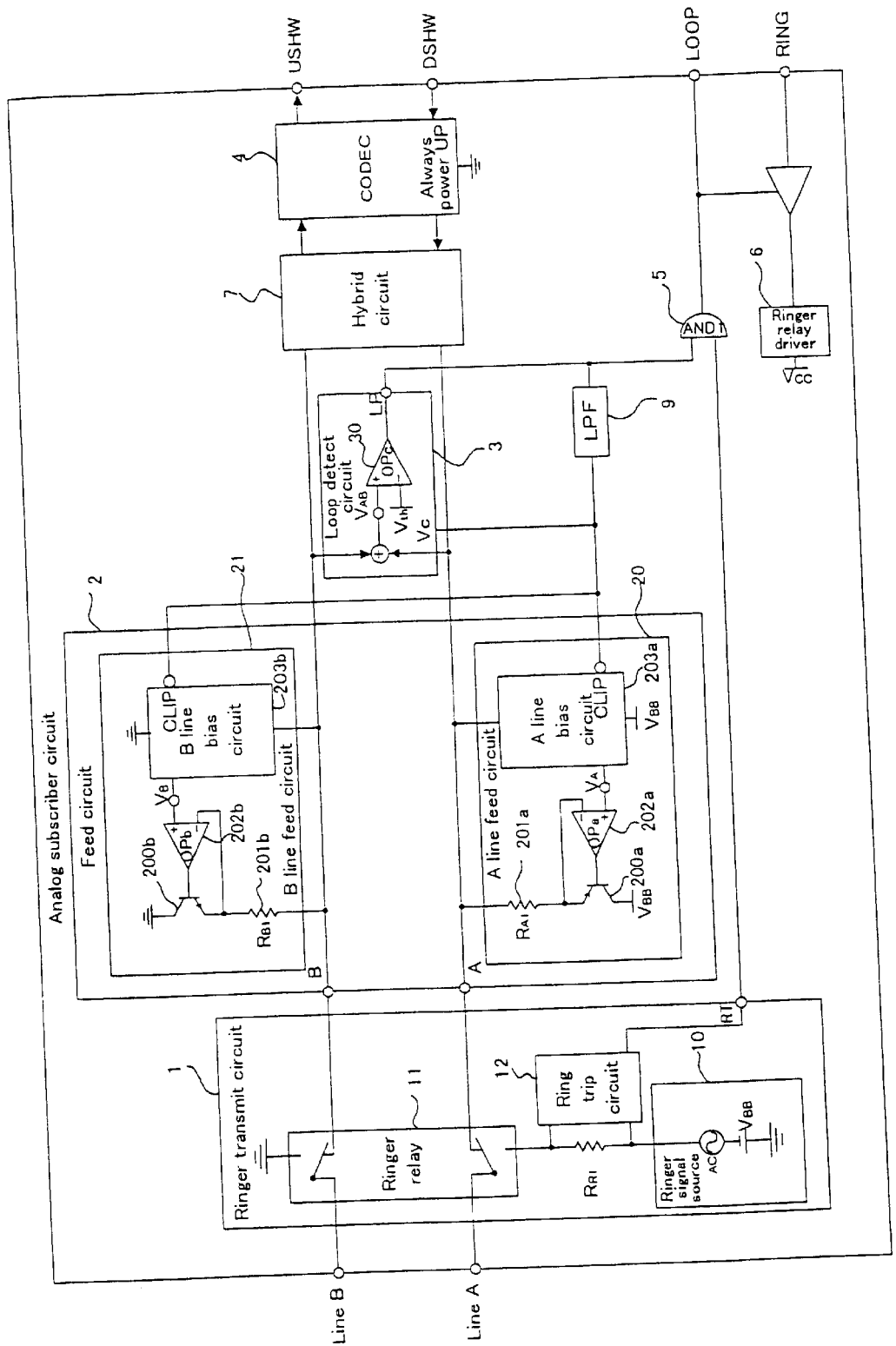
FIG. 21 is a diagram showing a CLIP function-equipped analog subscriber circuit previously proposed by the applicants, as a third example of prior art.

FIG. 21 is a CLIP function-equipped analog subscriber circuit, which was proposed previously by the applicants, and is provided as a third example of prior art. This subscriber circuit is an example of a CLIP function-equipped analog subscriber circuit disclosed in Japanese Patent Laid-open No. 8-198650.

The difference between this subscriber circuit and the third prior art example CLIP function-equipped analog subscriber circuit shown in FIG. 16 above is the fact that the CODEC 4 is constantly in a powered-up state without a system interface CLIP. In accordance therewith, the battery feed circuit 2 is in the OHT mode when the subscriber terminal is in the on-hook state.

Figure 22:
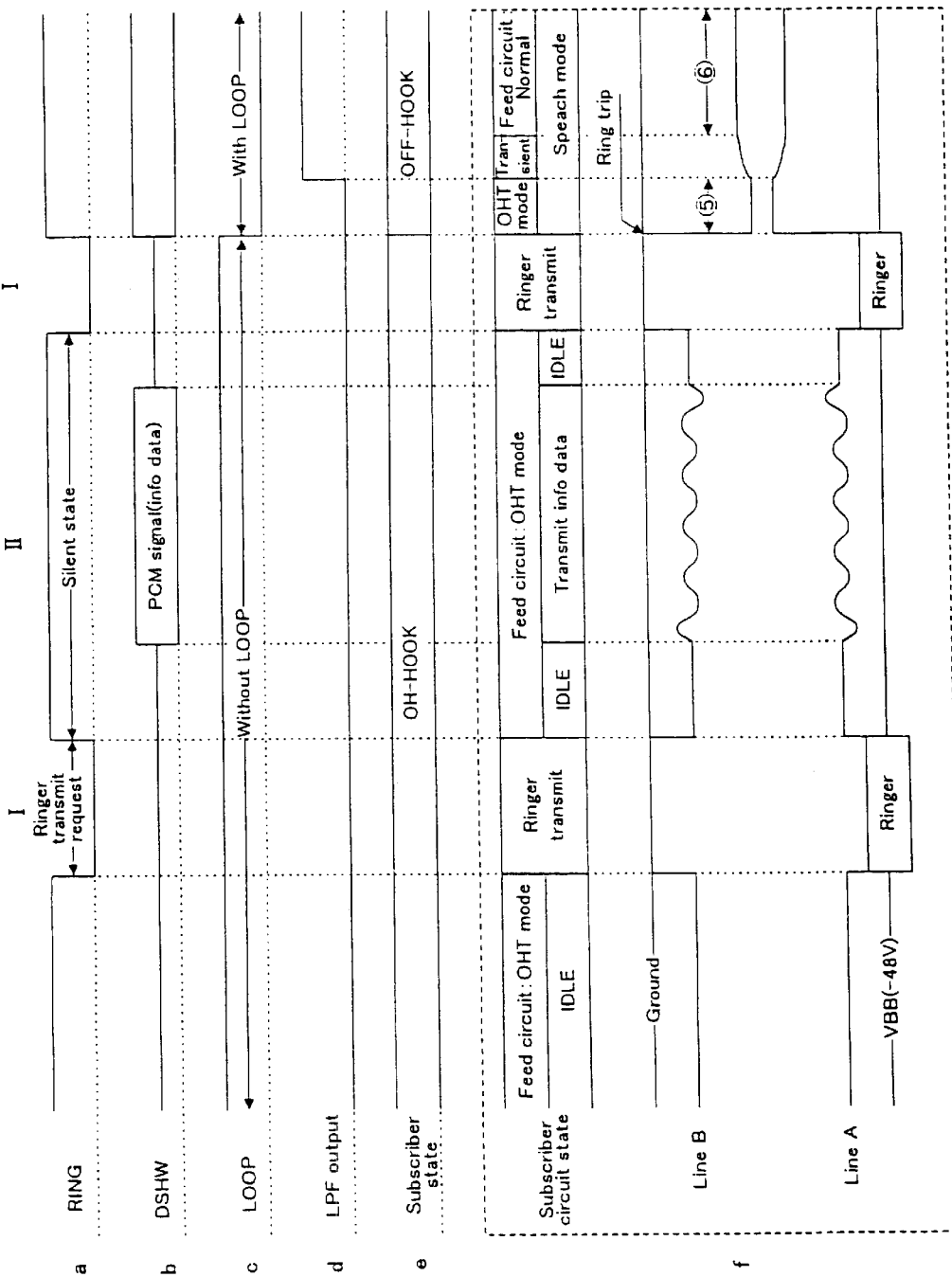
FIG. 22 is a diagram showing an operational timing chart of the CLIP function-equipped analog subscriber circuit of the third prior art example of FIG. 21.

FIG. 22 is a diagram showing an operational time chart of the third prior art example CLIP function-equipped analog subscriber circuit shown of FIG. 21. The on-hook transmission operational timing of FIG. 22 differs from that shown previously in FIG. 18 in the following manner.

In FIG. 22, mark 5̂ indicates that voltage between A–B lines and speech current are small, because the battery feed circuit is biased under the on-hook transmission state, and mark 6̂ indicates voltage between A–B lines and speech current are normal, because the battery feed circuit is not biased under the normal state.

The CLIP subscriber circuit of FIG. 22 applies the output results (LP) of a loop detecting circuit 3 to the battery feed circuit 2 via a low-pass filter (LPF) 9 so that bias is applied to the battery feed circuit 2 when the subscriber terminal is on-hook. In accordance therewith, the OHT mode is controlled. The polarity of the output results (LP) of the loop detecting circuit 3 in FIG. 21 are inverted inside the low-pass filter 9.

Figure 23:
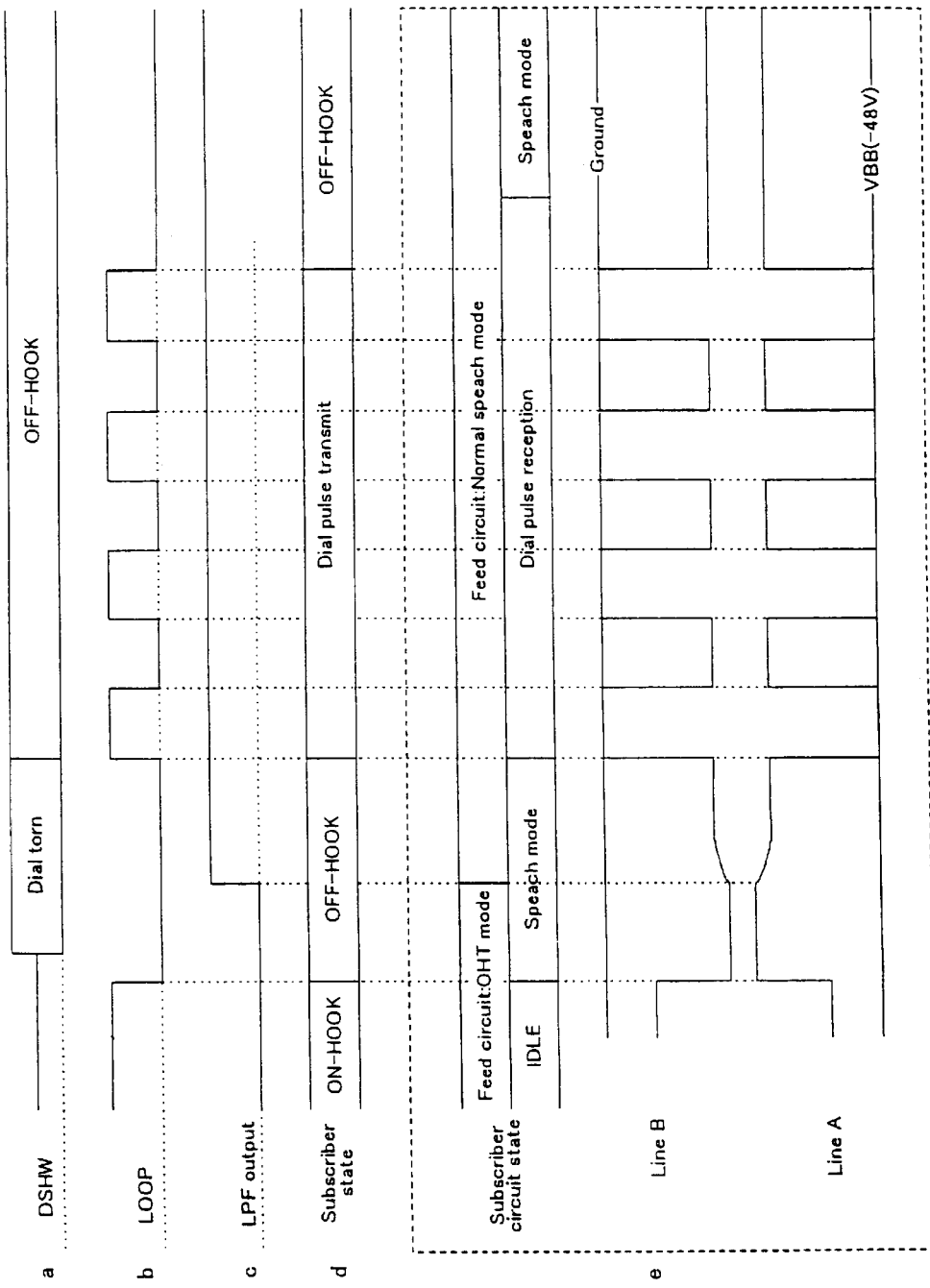
FIG. 23 is a diagram showing the operation of the low-pass filter 9 in FIG. 21.

The operation of the low-pass filter 9 in FIG. 21, as shown in FIG. 23, uses loop detection results (FIG. 23b) to control the on-hook transmission operation of the battery feed circuit 2, and then prevents the battery feed circuit 2 from entering the OHT mode at the break pulse of the dial pulse.

The transient voltage change of line A and line B in accordance with the battery feed circuit 2 bias change (FIG.

23e) was drastically slowed down from 10 ms to 200 ms to counter impulse noise, and requires more time than dial pulse change.

Therefore, as shown in FIG. 23, when the battery feed circuit 2 bias flutters at dial pulse reception, loop detection results become unstable. Consequently, at dial pulse reception, the battery feed circuit is set to a non-bias state (Normal call state) in accordance with the low-pass filter 9 (FIG. 23c).

In accordance therewith, since the battery feed circuit 2 is in the OHT mode when the subscriber terminal is in the on-hook state, information data can be sent at any time other than in the ringer transmission state.

With the exception of the above-described difference, FIG. 22 timing is the same as that of FIG. 18. The same as the example of FIG. 18, a PCM signal is sent from the system to the CODEC 4 via the DSHW in the silent state II when there is an incoming call to a CLIP subscriber terminal (FIG. 22b). The CODEC 4 converts this PCM signal to a voice signal (analog signal), and outputs the voice signal to line A and line B via the hybrid circuit 7.

In the above-described third example of prior art, contrary to the second example of prior art, the speech current problem when the subscriber terminal is off-hook is practically solved. However, the following problems exist.

That is, when the subscriber terminal is on-hook, there is trouble in that the open voltage between line A and line B decreases.

In the first example of prior art shown in FIG. 16, open loop voltage was 48V when the subscriber terminal was in the on-hook state. However, in the second prior art example, the open loop voltage becomes 40V as a result of battery feed circuit bias, decreasing approximately 8V from the first prior art example.

Furthermore, there is also the problem of current consumption increasing due to the constant power-on state of the CODEC 4.

In the first prior art example, the system interface required an interface for CLIP control. To achieve this new function, the only thing that can be done is to replace/enlarge the analog subscriber circuit to a CLIP-enabled substrate, and preparing this kind of interface anew for all installed host systems is an impossible task from the standpoints of cost and number of processes.

In the second example of prior art, the battery feed circuit 2 is in the on-hook transmission mode at times other than CLIP. Consequently, there are terminal malfunctions in accordance with the decrease of open loop voltage when the subscriber terminal is on-hook, and the length of the subscriber line is shortened in accordance with a decrease in speech current when the subscriber terminal is off-hook.

That is, it is impossible to connect to long-distance terminals accommodated to date. Further, there are problems such as an increase in current consumption in accordance with the CODEC 4 always being in a powered-up state.

In the third prior art example, the second example of prior art is improved, solving for the decrease in speech current when the subscriber terminal is off-hook. However, the battery feed circuit is in the on-hook transmission mode even at times other than CLIP service when the subscriber terminal is in the on-hook state.

In accordance therewith, problems such as terminal malfunctions in accordance with a decrease in open loop voltage when the subscriber terminal is on-hook, and an increase in current consumption in accordance with the CODEC 4 constantly being in the powered-up state, still remain.

Therefore, the present invention solves for these problems inherent in conventional analog subscriber circuits. That is, there is no need for a new interface between a host system and an analog subscriber circuit.

Further, the present invention solves for the problems of decreased open loop voltage, decreased speech current at off-hook, and increased current consumption resulting from the constant power-on state of the CODEC 4 when the subscriber terminal of an analog subscriber circuit is on-hook.

The embodiments of the present invention are described hereinbelow.

FIG. 1 is a block diagram of the basic constitution of the present invention. In FIG. 1, the CLIP analog subscriber circuit of the present invention features the same constitution as the examples of prior art described above, having a ringer transmitting circuit 1, which transmits a ringer, a battery feed circuit 2, which supplies speech current to a terminal, a loop detecting circuit 3, which detects subscriber terminal on-hook/off-hook, a CODEC 4, which converts analog and digital signals, and a hybrid circuit 7, which performs mutual conversion of 2 subscriber lines and 4 lines on the CODEC side.

Furthermore, the present invention is characterized in that it has a timer 60. The object of this timer 60 is to detect an on-hook transmission transition space for achieving CLIP service during ringing.

That is, the timer 60 is for detecting ringing and a silent state between ringing during ringing processing.

This timer 60 starts operation from the rising edge of a RING signal, which indicates the end of ringer transmission. And timer operation ends when a predetermined time has elapsed.

This predetermined time, following the transition to an on-hook transmission state after ringer transmission, allows autonomous recovery from the on-hook transmission state in any state, including but not limited to the on-hook/off-hook of the terminal on the incoming call side.

Therefore, <<the chance to start an on-hook transmission state>> comes after ringer transmission termination, i.e. after ringer relay recovery, and <<the chance to terminate an on-hook transmission state>> comes after the elapse of a predetermined time following ringer transmission.

As used here, predetermined time refers to a fixed time specified with a customer from ringer relay recovery to ringer relay operation (silent state). The time required for information data transmission is shorter than the silent state.

In the CLIP subscriber circuit of FIG. 1, a bias is applied to the battery feed circuit 2, and the CODEC 4 is powered up in accordance with the output results of the timer 60, which is a characteristic of the present invention. At the same time, a PCM signal is sent to the CODEC from the system via the DSHW, and converted to a voice signal (analog signal) by the CODEC 4, and this voice signal is outputted to line A and line B via the hybrid circuit 7.

In this manner, according to the operation of the timer 60 of FIG. 1, the control of the battery feed circuit bias state, and the power-up/power-down of the CODEC 4 becomes precise, thus solving for past problems.

Figure 2:
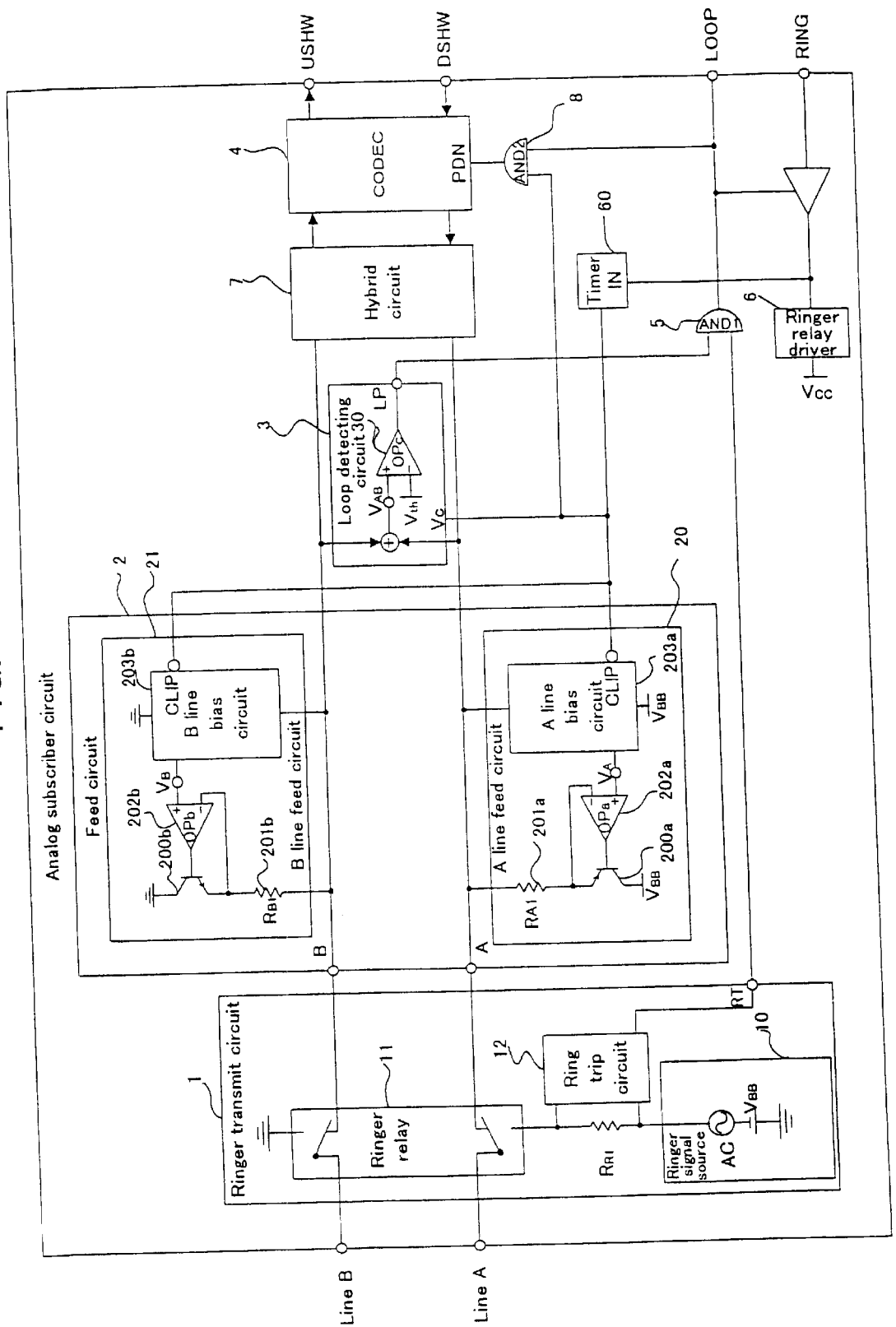
FIG. 2 is a block diagram of a first embodiment of the present invention.
Figure 3:
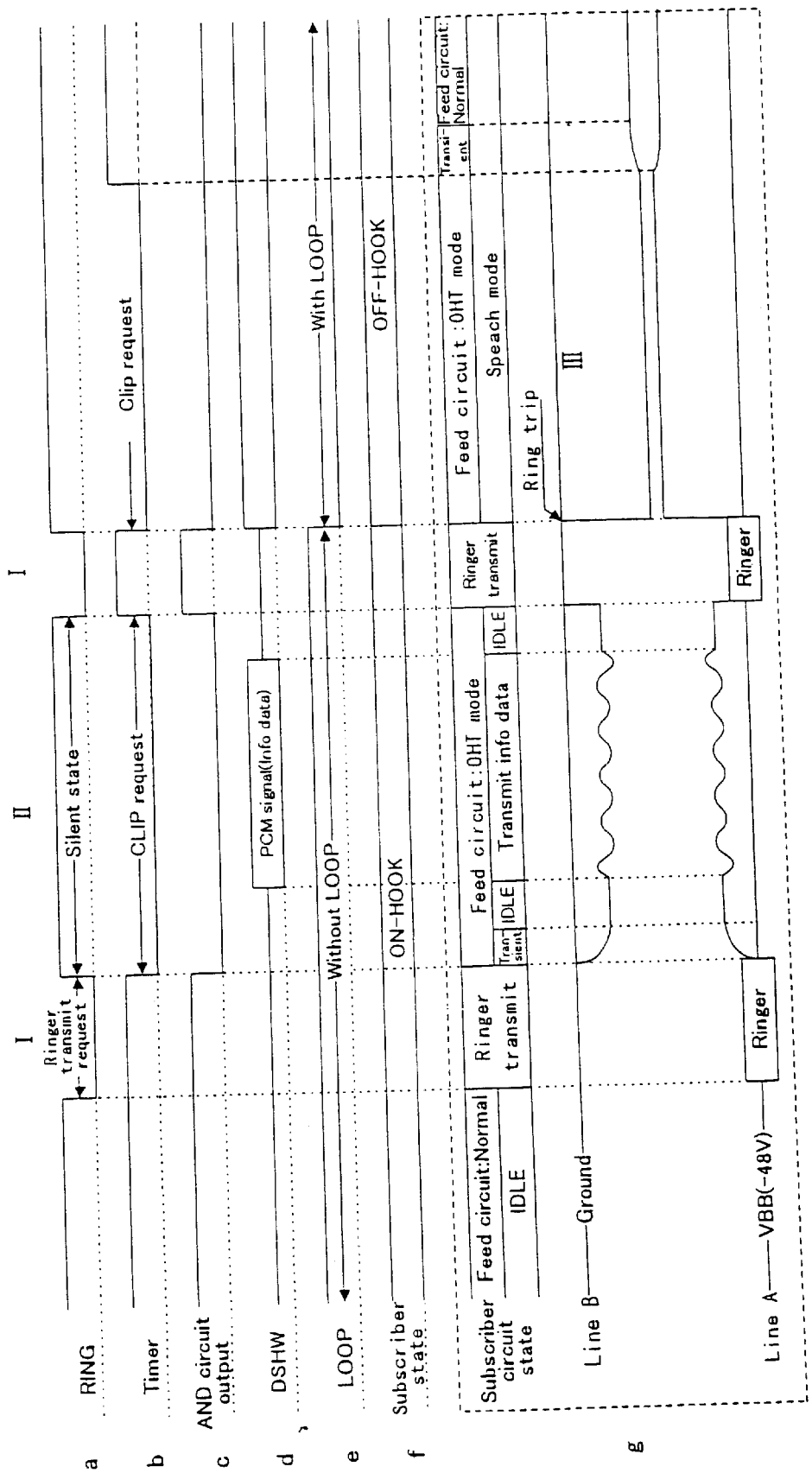
FIG. 3 is a diagram showing an operational time chart of the embodiment of the CLIP function-equipped analog subscriber circuit of FIG. 2.

FIG. 2 is a block diagram of a first embodiment of the present invention. FIG. 3 shows an operational time chart of the embodiment of a CLIP function-equipped analog subscriber circuit of FIG. 2. And FIGS. 4A and 4B respectively show an example of the circuitry, and a time chart of the timer 60 in FIG. 2.

Figure 4A:
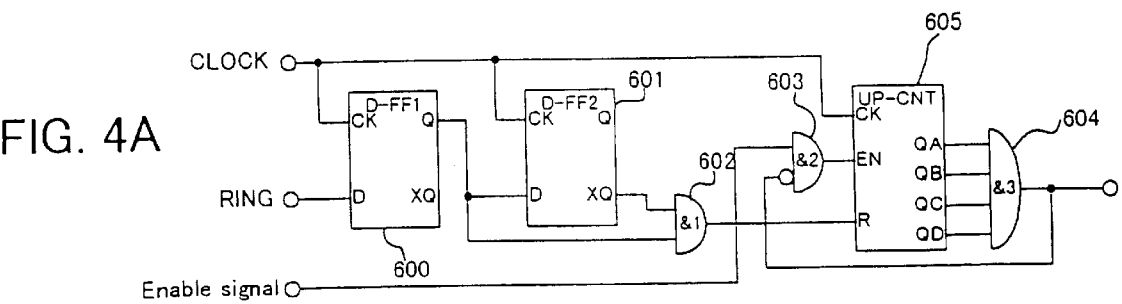
FIGS. 4A and 4B are diagrams showing an example of the timer circuit 60 in FIG. 2, and a time chart.

The constitution of the embodiment of the timer 60 shown in FIG. 4A is omitted from the diagram in FIG. 2, but a clock (clock a of FIG. 4B) for operating the logic inside the timer 60, and an enable signal (enable signals c, f of FIG. 4B), which decides the operating speed of an up counter 605 inside the timer 60 are granted.

Furthermore, as for timer 60 input, a RING signal (FIG. 4B, b) is applied from the host system. Timer 60 output is supplied to the CLIP terminal of the battery feed circuit 2, and to 1 input side of the second AND gate (AND2) 8.

A detailed description of the operation of the timer 60 shown in FIG. 4A is provided below. A 2-stage flip-flop circuit (D-FF1) 600, (D-FF2) 601 detects the point at which a RING="Low" state, which is a ringer signal transmission request from the host system, changes to RING="High" which is the silent state resulting from ringer transmission termination.

Figure 4B:
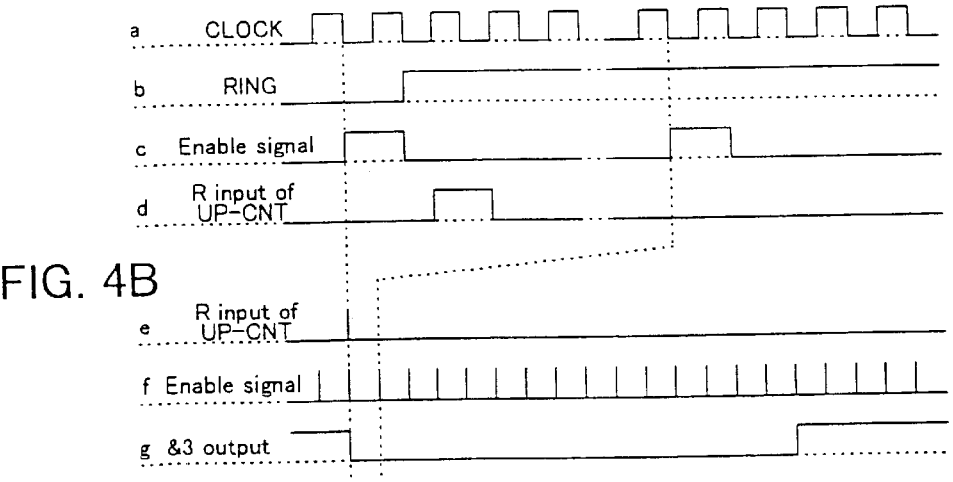

The up counter 605 is reset in accordance with a signal created from the logic of D-FF1 (600), D-ff2 (601) and AND gate (&1) 602. And the operating speed is controlled by an enable signal (FIGS. 4B, f).

A silent state is detected in accordance with the up counter 605. With the up counter 605, for the purpose of indicating the arbitrary rise time of a RING signal, all the output therefrom is detected by AND gate (&3) 604 when this output reaches the "High" state so that only a one-shot operation is performed. And then, by feeding back the detection signal thereof to the negative input terminal of AND gate (&2) 603, the operation of the up counter 605 is terminated.

The operation of a first embodiment shown in FIG. 2, which embodiment uses the timer 60 of FIG. 4, is described hereinbelow. In the CLIP subscriber circuit of FIG. 2, bias is applied to the battery feed circuit 2 in a silent state II when there is an incoming call to the CLIP subscriber terminal. And the CODEC 4 is powered up by way of the AND gate 8.

A PCM signal is sent from the system to the CODEC 4 via the DSHW in the silent state II when there is an incoming call to the CLIP subscriber terminal, this PCM signal is converted to a voice signal (analog signal) by the CODEC 4, and this voice signal is outputted to line A and line B via the hybrid circuit 7.

However, in FIG. 3, for a short period following ring trip (period III of FIG. 3g), despite the fact that the subscriber terminal is off-hook, speech current is a low state because the battery feed circuit is in the OHT mode.

The first embodiment is characterized in that the interface between the system and the analog subscriber circuit shown in the first example of prior art is not needed. The first embodiment also prevents a decrease in open loop voltage when the subscriber is on-hook, and prevents to the utmost a decrease in speech current at off-hook in the analog subscriber circuit, which were problems in the second and third examples of prior art. In accordance therewith, the problem of current consumption increasing in accordance with the constant power-on state of the CODEC is solved.

Figure 5:
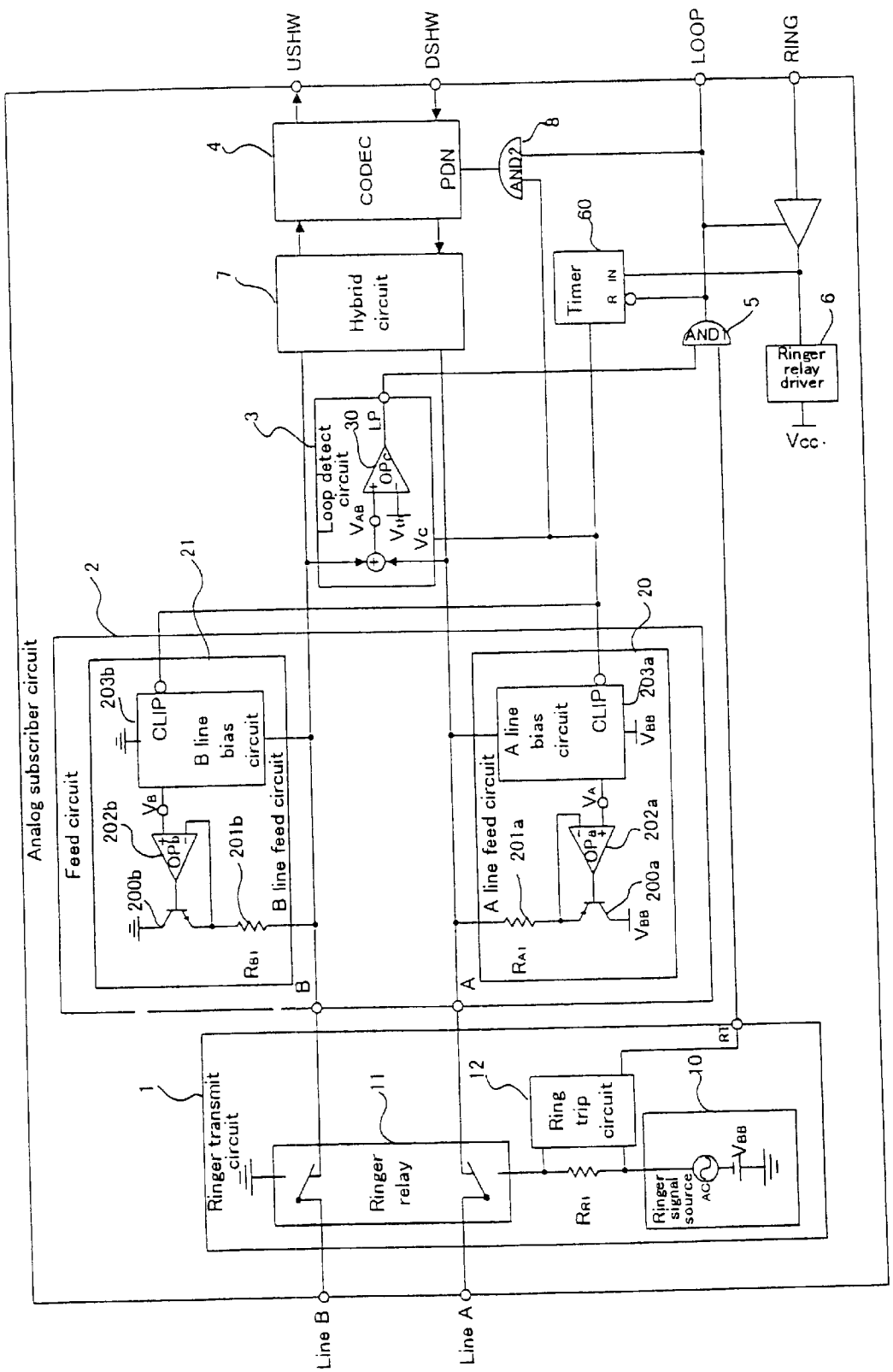
FIG. 5 is a block diagram of the constitution of a second embodiment of the present invention.
Figure 6:
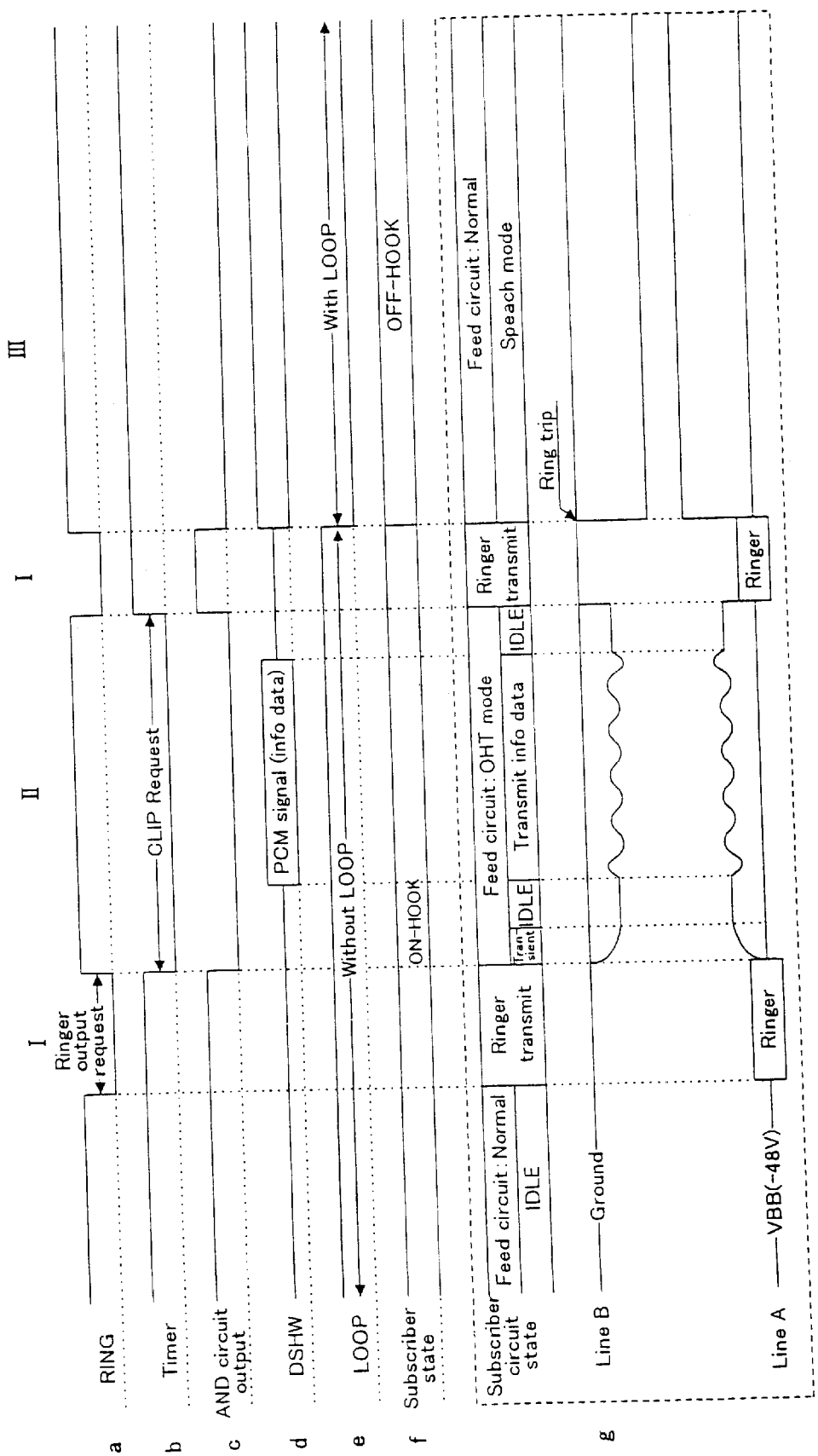
FIG. 6 is a diagram showing an operational time chart of the embodiment of the CLIP function-equipped analog subscriber circuit of FIG. 5.

FIG. 5 is a block diagram of the constitution of a second embodiment of the present invention. FIG. 6 is an operational time chart of the CLIP function-equipped analog subscriber circuit of the embodiment of FIG. 5. And FIGS. 7A, 7B, 7C show an example of the circuitry of the timer 60 in the embodiment of FIG. 5, and an operational time chart thereof.

The constitution of the timer 60 shown in FIG. 7 is omitted from the diagram of the timer 60 illustrated in FIG. 5, but a clock (FIGS. 7B, 7C, a) for operating the logic inside the timer, and an enable signal (FIGS. 7B, 7C, d, g), which determines the operating speed of the up counter 605 inside the timer are granted.

By way of describing the operation of the timer 60 of FIG. 7A, the timer 60 is constituted having flip flops (D-FF1, D-FF2) 600, 601, and AND gates (&1, &2, &3) 602, 603, 604, which detect the point of change from a RING="Low" state, which is a ringer signal transmission request, to RING="High" which is a silent state, and an up counter (UP-CNT) 605, which is reset by a reset signal (FIGS. 7B, e) generated by the these logic circuits, and the operating speed of which is controlled by an enable signal (FIGS. 7B, d).

With the up counter 605, a feedback signal is applied to AND gate (&2) 603 so as to stop operation when all up counter 605 output becomes "High" so that only a one-shot operation is performed to indicate the arbitrary rise time of the RING signal (FIGS. 7B, 7C, b).

Further, this operation differs from that of the timer 60 in the first embodiment in that the LOOP signal is preset for the flip-flops (D-FF1, D-FF2) 600, 601, AND gates (&1, &2, &3) 602, 603, 604, and up counter 605.

This function is for controlling the operation of the timer 60 when the subscriber terminal is on-hook, and for eliminating the post-ring trip off-hook low speech current state (period III of FIG. 3) in the operation of the first embodiment.

The operation of the second embodiment shown in FIG. 5, which uses the timer of FIG. 7A, is described. The CLIP subscriber circuit shown in FIG. 5 applies bias to the battery feed circuit 2 (FIG. 6g) in a silent state II when a call is coming in to a CLIP subscriber terminal. Furthermore, the power to the CODEC 4 is increased.

A PCM signal is sent from the system to the CODEC 4 via the DSHW in a silent state II when there is an incoming call to a CLIP subscriber terminal, this PCM signal is converted to a voice signal (analog signal) by the CODEC 4, and this voice signal is outputted to line A and line B via the hybrid circuit 7.

This second embodiment is characterized in that it prevents the brief decrease in speech current following ring trip shown in the operational time chart (FIG. 3) of the first embodiment (compare period III of FIG. 3 and FIG. 6).

Figure 8:
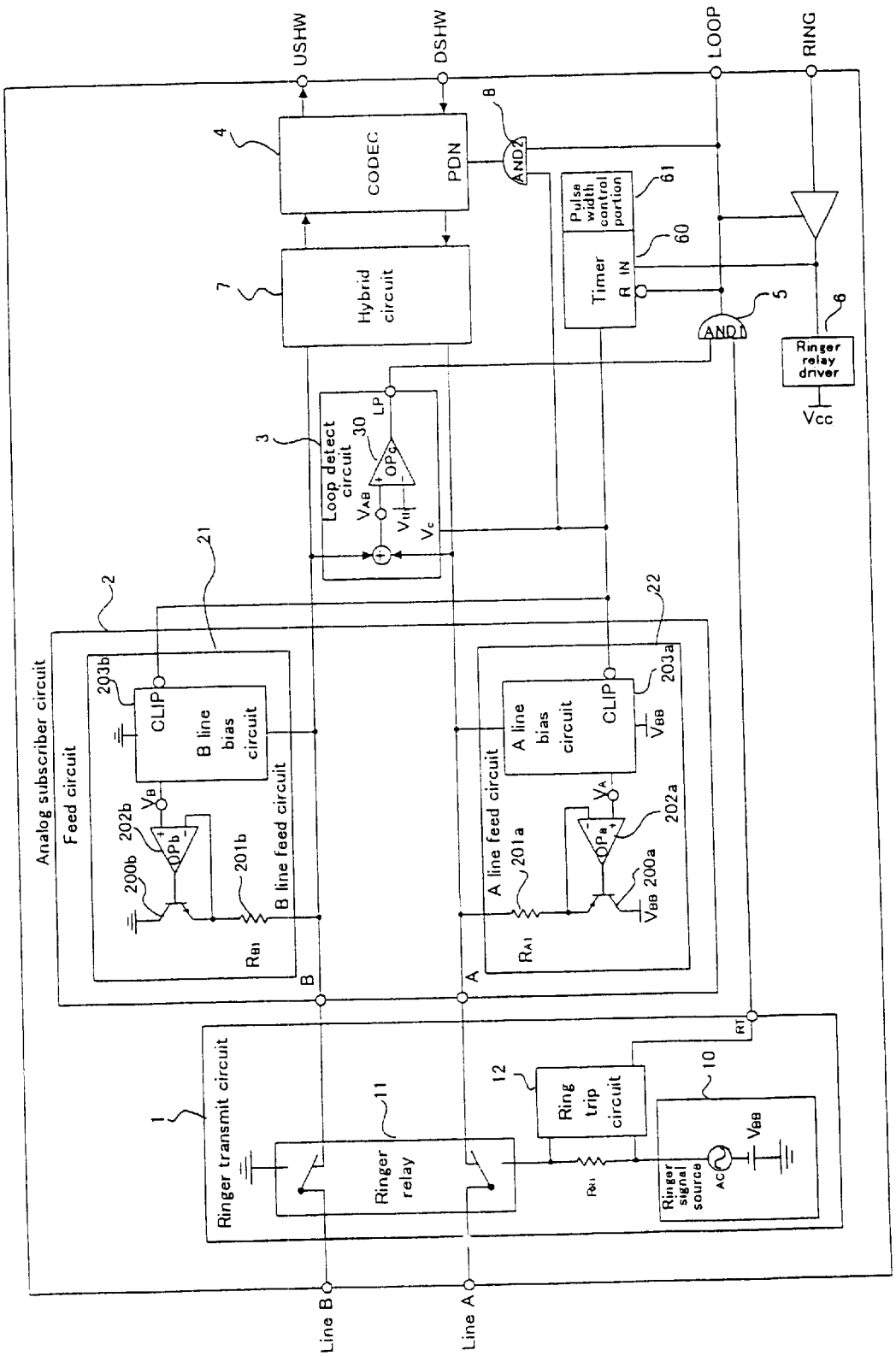
FIG. 8 is a block diagram of the constitution of a third embodiment of the present invention.

FIG. 8 is a block diagram of the constitution of a third embodiment of the present invention. The operational time chart therefor is the same as that of the second embodiment shown in FIG. 6. Further, an example of the circuitry, and a time chart for the timer 60 in FIG. 8 are shown in FIG. 9.

Figure 9A:
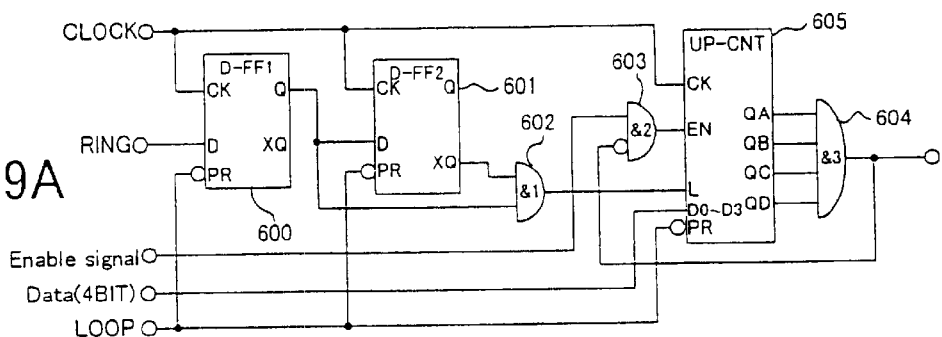
FIGS. 9A, 9B and 9C are diagrams showing an example of the timer circuit 60 in FIG. 8, and a time chart.
Figure 9B:
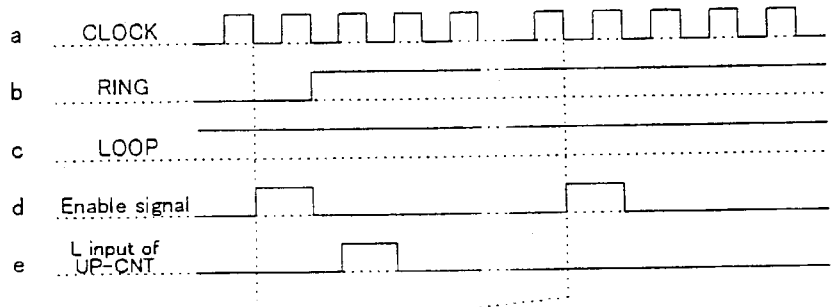
Figure 9B:
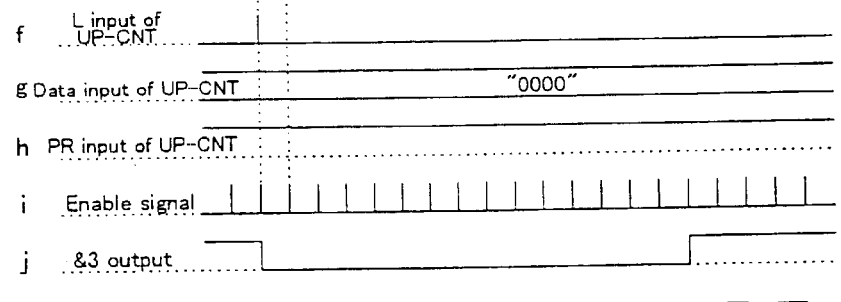
Figure 9C:
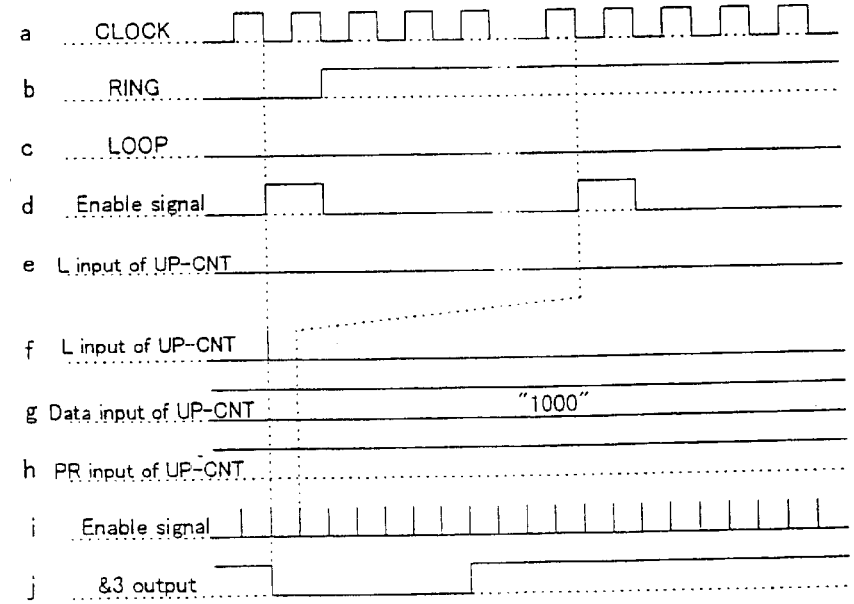

The timer 60 in the embodiment of FIG. 8 is illustrated in FIG. 9A. The same as the above descriptions of the first and second embodiments, a clock for operating the logic inside the timer 60, and an enable signal (FIGS. 9B, 9C, d, i), which decides the operating speed of an up counter 605 inside the timer 60 are supplied to the terminal of the timer 60 illustrated in FIG. 8, but not shown in FIG. 9A.

By way of describing the operation of the timer 60 of FIG. 9A, the constitution which detects the point of change from a RING="Low" state (FIGS. 9B, 9C, b), which is a ringer signal transmission request, to RING="High" which is a silent state, has logic constituted from flip-flops (D-FF1, D-FF2) 600, 601, and AND gates (&1, &2) 602, 603.

Furthermore, the timer 60 has an up counter 605, and this up counter 605 is reset by a signal generated by this logic, has its operating speed controlled by an enable signal, and detects a silent state.

With the up counter 605, at the point when the AND gate 604 detects a state, in which all up counter 605 output has become "High" so that only a one-shot operation is performed to indicate the arbitrary rise time of the RING signal, feedback is applied so as to stop the operation thereof.

Further, by comparison to the operation of the timers 60 of the first and second embodiments, in the third embodiment a pulse width control portion 61 is provided so as to control the pulse width of timer 60 output.

The up counter 605 is constituted so that the output of AND gate (&1) 602 is inputted as a load signal, and load data is inputted to terminals D0–D3. For example, by comparing FIGS. 9B, 9C, it can be seen that the pulse width of AND gate (&3) 604 output differs in accordance with the load data (FIGS. 9B, 9C, g) inputted to the up counter 605.

As described above, the third embodiment has the same operational timing as the second embodiment above, but varies the width of timer output, which indicates a silent state. In accordance therewith, the third embodiment is characterized in that it enables the optimal adjustment of the time relationship of ringing and the silent state between ringing during ringer processing, which differs from one country to the next.

A central office switching system, which operates for a long time, must improve and add new service equipment to existing switches in order to constantly expand the services capable of being provided in accordance with the trends of subscriber requirements following the startup of service operations.

In accordance with using an analog subscriber circuit of the present invention, it is possible to provide a "calling number display service," which realizes CLIP functions targeted by the present invention even in most already-installed switching systems.

More specifically, ordinary methods for achieving this function in an existing system require a new signal (SD) for controlling CLIP functions between the subscriber line and the controlling portion. However, optimal cost design is implemented for a subscriber circuit and controlling portion, which account for the bulk of switching system costs, and there is no redundant spare signal. Ordinarily, an SD signal generally comprises 4-bits per circuit, and is used for startup/ringer signal/polarity reversal/tests.

For this reason, a new controlling portion, which adds a 1-bit signal to the interface with a CLIP-enabled subscriber circuit, is required. Further, complicated processing becomes necessary for incorporating new cable construction, and a new control system into the switching system, and there are also times when it is necessary to reconnect to a new subscriber circuit, which provides a subscriber terminal connection route that differs completely from the existing subscriber circuit.

However, using the subscriber circuit of the present invention offers the cost advantage of enabling the existing control apparatus to be used as-is, and is also advantageous in that in can be installed simply by replacing the subscriber circuit package, thus eliminating the need for any construction work.

Further, the subscriber circuit of the present invention is extremely effective for achieving CLIP services without changing/adding a new CLIP service control apparatus to an existing switching system.

What is claimed is:

1. A analog subscriber circuit for use in a switching system, which supplies a ringer signal to a subscriber line via a ringer relay, the analog subscriber circuit comprising:
   - a timer, which commences timer operation when the recovery of the ringer relay is detected, and terminates the timer operation at a predetermined time;
   - a battery feed circuit supplying speech current to the subscriber line via the ringer relay when a subscriber terminal is in an off-hook state; and
   - a circuit, which controls the bias voltage of said battery feed circuit to an ON state during the operation period of the timer.

2. The analog subscriber circuit according to claim 1, further comprising:
   - a loop detecting circuit, which detects a telephone terminal being off-hook,
   - wherein said timer is reset by said loop detecting circuit in accordance with detection of said telephone terminal being off-hook.

3. The analog subscriber circuit according to claim 1, wherein said timer can be set to an arbitrary timer time.

4. An analog subscriber circuit, comprising:
   - a ringer transmitting circuit, which is connected to line A and line B, and which transmits a ringer signal in accordance with a ringer transmission request signal from a host system;
   - a battery feed circuit, which supplies speech current to this line A and line B; and
   - a timer, which detects, in accordance with a change in the level of a ringer transmission request signal from said host system, the end of transmission of a ringer signal transmitted by said ringer transmitting circuit, starts timer operation, and ends the timer operation after a predetermined time has elapsed,
   - wherein speech current is supplied from the battery feed circuit to the line A and line B from said battery feed circuit during the operation period of the timer.

5. The analog subscriber circuit according to claim 4, further comprising:
   - a CODEC, which converts subscriber information data from said host system to an analog signal,
   - wherein the CODEC is powered up during the operation period of said timer.

6. The analog subscriber circuit according to claim 4, wherein said timer time can be arbitrarily set.

* * * * *